US006221997B1

(12) United States Patent
Woodhouse et al.

(10) Patent No.: US 6,221,997 B1
(45) Date of Patent: Apr. 24, 2001

(54) BIODEGRADABLE POLYURETHANES

(76) Inventors: Kimberly Ann Woodhouse, 78 Fern Valley Crgs, Richmond Hill, Ont. (CA), L4E 2J4; Gary Alan Skarja, 88 Redpath Ave., #807, Toronto, Ont. (CA), M4S 2J8

(*) Notice: Subject to any disclaimer, the term of this patent is extended or adjusted under 35 U.S.C. 154(b) by 0 days.

(21) Appl. No.: 09/067,080

(22) Filed: Apr. 27, 1998

Related U.S. Application Data

(60) Provisional application No. 60/069,327, filed on Apr. 28, 1997.

(51) Int. Cl.$^7$ .................................................. C08G 18/65
(52) U.S. Cl. ................................. 528/61; 528/84; 528/85
(58) Field of Search ........................................ 528/61, 84

(56) References Cited

U.S. PATENT DOCUMENTS

| | | | |
|---|---|---|---|
| D. 323,895 | 2/1992 | Protzmann | D24/216 |
| 3,932,359 | * 1/1976 | Fujimoto et al. | 428/423 |
| 4,259,959 | 4/1981 | Walker | 606/221 |
| 4,353,996 | 10/1982 | Marconi et al. | 523/105 |
| 4,379,138 | 4/1983 | Pitt et al. | 514/772.7 |
| 4,391,964 | 7/1983 | Wick et al. | 523/105 |
| 4,404,296 | 9/1983 | Schapel | 523/105 |
| 4,458,678 | 7/1984 | Yannas et al. | 128/155 |
| 4,477,325 | 10/1984 | Osburn | 264/488 |
| 4,505,266 | 3/1985 | Yannas et al. | 428/2 |
| 4,533,635 | 8/1985 | Guedon et al. | 435/376 |
| 4,552,802 | 11/1985 | Mechin | 442/37 |
| 4,561,435 | 12/1985 | McKnight et al. | 602/42 |
| 4,563,490 | 1/1986 | Stol et al. | 524/24 |
| 4,593,053 | 6/1986 | Jeune et al. | 523/111 |
| 4,603,070 | 7/1986 | Steel et al. | 428/88 |
| 4,608,041 | 8/1986 | Nielsen | 604/23 |
| 4,635,624 | 1/1987 | Gilman | 602/42 |
| 4,649,909 | 3/1987 | Thompson | 602/42 |
| 4,661,530 | 4/1987 | Gogolewski et al. | 521/170 |
| 4,703,108 | 10/1987 | Silver et al. | 530/356 |
| 4,705,820 | 11/1987 | Wang et al. | 524/381 |
| 4,715,857 | 12/1987 | Juhasz et al. | 477/49 |
| 4,725,273 | 2/1988 | Kira | 521/905 |
| 4,740,528 | * 4/1988 | Garvey et al. | 521/128 |
| 4,776,853 | 10/1988 | Klemen et al. | 623/1 |
| 4,793,336 | 12/1988 | Wang | 604/304 |
| 4,801,299 | 1/1989 | Brendel et al. | 623/1 |
| 4,808,353 | 2/1989 | Nambu et al. | 264/28 |
| 4,817,394 | 4/1989 | Juhasz | 602/42 |
| 4,822,349 | 4/1989 | Hursey et al. | 424/445 |
| 4,839,215 | 6/1989 | Starling et al. | 428/131 |
| 4,852,568 | 8/1989 | Kensey | 606/213 |
| 4,875,473 | 10/1989 | Alvarez | 602/58 |
| 4,909,244 | 3/1990 | Quarfoot et al. | 128/156 |
| 4,913,897 | 4/1990 | Chvapil et al. | 424/61 |
| 4,983,581 | 1/1991 | Antoniades et al. | 514/12 |
| 4,988,341 | 1/1991 | Columbus et al. | 604/306 |
| 5,000,963 | 3/1991 | Hefton | 424/574 |
| 5,003,970 | 4/1991 | Parker et al. | 128/90 |
| 5,015,228 | 5/1991 | Columbus et al. | 604/51 |
| 5,015,584 | 5/1991 | Brysk | 623/15 |
| 5,025,783 | 6/1991 | Lamb | 128/156 |
| 5,035,893 | 7/1991 | Shioya et al. | 424/447 |
| 5,100,992 | 3/1992 | Cohn et al. | 528/26 |
| 5,120,322 | 6/1992 | Davis et al. | 604/265 |

(List continued on next page.)

FOREIGN PATENT DOCUMENTS 0 564 786 A2   10/1993   (EP) .

OTHER PUBLICATIONS

T. E. Lipatova et al. Structural Peculiarities of Block Copolyurethanes with Peptide Links as Rigid Block Extenders. Biomaterials 1983, vol. 4 Jul. 1983 Butterworth & Co. (Pub) pp. 201–204.

P. Bruin et al. Design and Synthesis of Biodegradable Poly(Ester–Urethane) Elastomer, Networks Composed of Non–Toxic Building Blocks. Makromol Chem, Rapid Commun. 9,589–594 (1988) (6 pages).

Chemical Abstracts 15740/vol. 60. 1964 Carboxyl Isocyanates; Garber et al.

S. Gogolewski and G. Galletti Degradable Microporous Vascular Prosthesis From Segmented Polyurethane Colloid & Polymer Sci. 264:854–858 (1986).

S. Gogolewski et al. Polyurethane Vascular Prosthesis in Pigs. Colloid & Polymer Sci 265:774–778 (1987).

Proc. 3rd International Biodegradation Symp. London, Applied Sci. (1975) Huang et al; pp. 731–741.

Plasmin Degradation of Cross–Linked Fibrin and Fibrin/Hy. Aluronan Coated Polyurethanes; Society for Biomaterials C. A. Bense et al; p. 464– (1997).

Development of Novel Bioresorbable Polyurethane Elastomers; Society for Biomaterials G. A. Skarja and K. A. Woodhouse p. 105 (1997).

Acellular Matrix for Dermal Implant Applications; Society for Biomaterials; p. 183 A. A. Robinson–Seurig et al. (1997).

Biodegradable Polymers Derived From Amino Acids A. J. Domb. Biomaterials 1990. vol. 11/Nov. pp. 686–689.

An Artificial Skin Based on Biodegradable Mixtures of Polylactides and Polyurethanes for Full–Thickness Skin Wound Covering S. Gogolewski & A. J. Pennings. (1983) M. Chem. Rap. Com. pp. 675–680.

News Release—Advanced Tissue Sciences, Inc. LaJolla. CA. Nov. 23, 1995.

Adhesion Behaviour of Rat Lymphocytes to Poly(ether)—Poly(Amino Acid) Block and Graft Copolymers M. Yokoyama et al JNL Biomedical Materials Research vol. 20; 867–878; 1986.

Synthesis of Polyetherurethanes: K. Sosa et al. Biomaterials 1985. vol. 6. Sep. pp. 312–324.

F. Sweeney; Intro. to RIM; 1979; p. 57.*

*Primary Examiner*—Rachel Gorr
(74) *Attorney, Agent, or Firm*—Thomas A. O'Rourke; Wyatt, Gerber & O'Rourke

(57) ABSTRACT

Disclosed herein is a biodegradable polyurethane material having a backbone containing at least one amino acid group. The amino acid group is in a condition rendering it recognizable by a biological agent.

23 Claims, 27 Drawing Sheets

U.S. PATENT DOCUMENTS

| | | | |
|---|---|---|---|
| 5,120,816 | 6/1992 | Gould | 528/76 |
| 5,145,770 | 9/1992 | Tubo et al. | 435/1 |
| 5,160,328 | 11/1992 | Cartmell et al. | 604/307 |
| 5,260,343 | 11/1993 | Harrison et al. | 521/51 |
| 5,264,218 | 11/1993 | Rogozinski | 424/445 |
| 5,273,900 | 12/1993 | Boyce | 530/356 |
| 5,334,527 | 8/1994 | Brysk | 623/15 |
| 5,334,691 | 8/1994 | Gould | 528/76 |
| 5,336,616 | 8/1994 | Livesey et al. | 435/1 |
| 5,364,756 | 11/1994 | Livesey et al. | 435/2 |
| 5,377,695 | 1/1995 | An Haack | 128/888 |
| 5,378,146 | 1/1995 | Sterrett | 433/11 |
| 5,378,461 | 1/1995 | Neigut | 514/460 |
| 5,380,294 | 1/1995 | Persson | 604/180 |
| 5,384,125 | 1/1995 | Di Pippo et al. | 424/443 |
| 5,389,092 | 2/1995 | Guillemet | 604/304 |
| 5,389,376 | 2/1995 | Duan et al. | 424/448 |
| 5,389,693 | 2/1995 | De Genova et al. | 521/51 |
| 5,391,641 | 2/1995 | Hugl et al. | 525/433 |
| 5,393,858 | 2/1995 | Meijs et al. | 528/61 |
| 5,395,305 | 3/1995 | Koide et al. | 602/48 |
| 5,395,398 | 3/1995 | Rogozinski | 607/50 |
| 5,395,888 | 3/1995 | Franke et al. | 525/90 |
| 5,407,717 | 4/1995 | Lucast et al. | 428/46 |
| 5,409,472 | 4/1995 | Rawlings et al. | 604/307 |
| 5,409,703 | 4/1995 | McAnalley et al. | 424/435 |
| 5,410,011 | 4/1995 | Konishi et al. | 528/73 |
| 5,410,016 | 4/1995 | Hubbell et al. | 528/354 |
| 5,415,627 | 5/1995 | Rasmussen et al. | 602/57 |
| 5,418,251 | 5/1995 | Niwano et al. | 514/440 |
| 5,419,765 | 5/1995 | Weldon et al. | 604/96 |
| 5,419,913 | 5/1995 | Podell et al. | 424/448 |
| 5,420,197 | 5/1995 | Lorenz et al. | 514/55 |
| 5,423,736 | 6/1995 | Cartmell et al. | 602/42 |
| 5,423,737 | 6/1995 | Cartmell et al. | 602/57 |
| 5,424,338 | 6/1995 | Krueger | 521/174 |
| 5,426,184 | 6/1995 | Pitha et al. | 536/46 |
| 5,429,589 | 7/1995 | Cartmell et al. | 602/42 |
| 5,429,590 | 7/1995 | Saito et al. | 602/48 |
| 5,429,591 | 7/1995 | Yamamoto et al. | 602/54 |
| 5,429,593 | 7/1995 | Matory | 602/79 |
| 5,430,121 | 7/1995 | Pudleiner | 528/28 |
| 5,431,622 | 7/1995 | Pyrozyk | 602/2 |
| 5,431,817 | 7/1995 | Braatz | 210/490 |
| 5,437,621 | 8/1995 | Andrews et al. | 602/42 |
| 5,437,622 | 8/1995 | Carion | 602/57 |
| 5,437,822 | 8/1995 | Wada et al. | 264/50 |
| 5,445,597 | 8/1995 | Clark et al. | 602/48 |
| 5,445,604 | 8/1995 | Lang | 602/47 |
| 5,578,022 | 11/1996 | Scherson et al. | 604/304 |
| 5,599,291 | 2/1997 | Balbierz et al. | 604/8 |
| 5,614,506 | 3/1997 | Falk et al. | 514/54 |
| 5,622,867 | 4/1997 | Livesey et al. | 436/18 |
| 5,632,778 | 5/1997 | Goldstein | 623/11 |
| 5,639,738 | 6/1997 | Falk et al. | 514/54 |

* cited by examiner

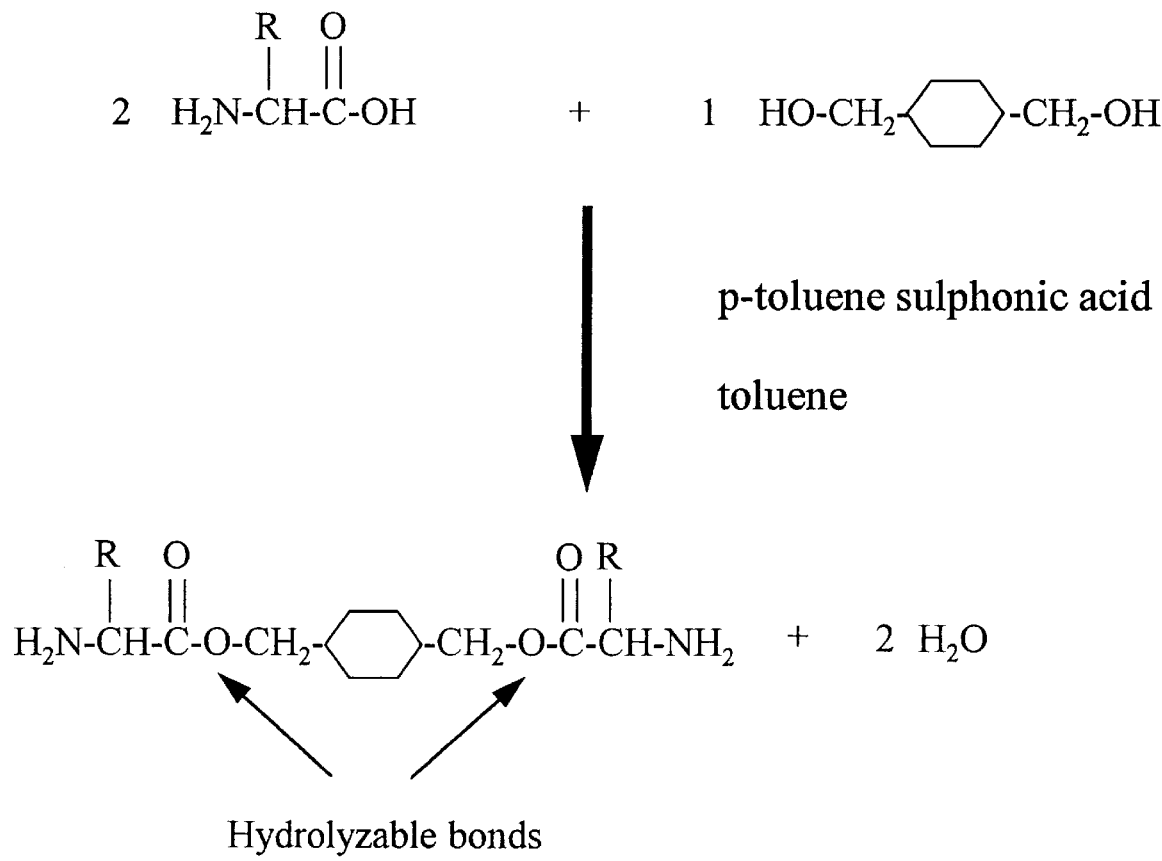
Reaction scheme for synthesis of diester diamine chain extenders
FIG. 1
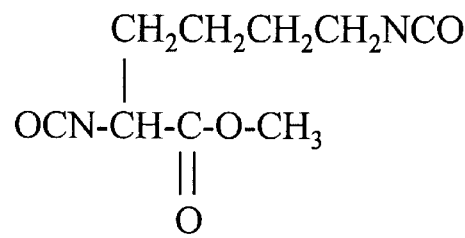
2,6 diisocyanato methyl caproate (LDI)
FIG. 2
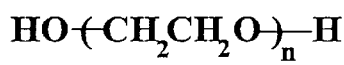            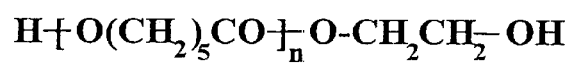
Soft segment polyols employed in polyurethane synthesis
FIG. 3

FIG. 4  Synthesis of linear, degradable polyurethane elastomers

Water Uptake for LDI Polyurethanes

Contact Angle Data for LDI Polyurethanes

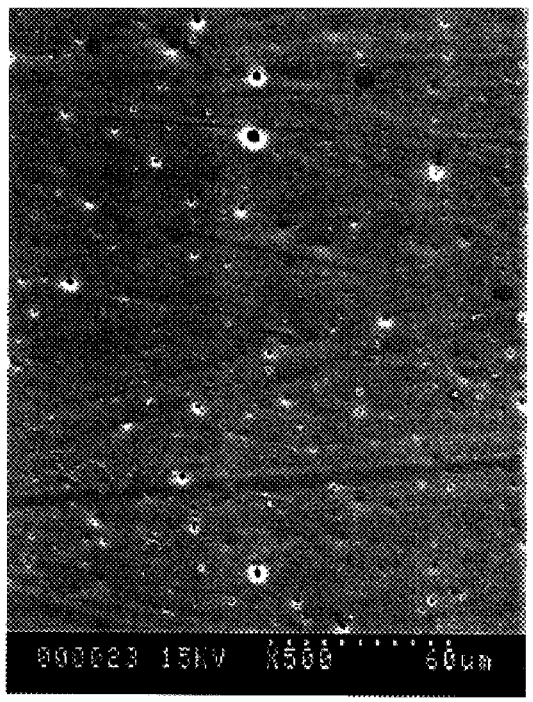 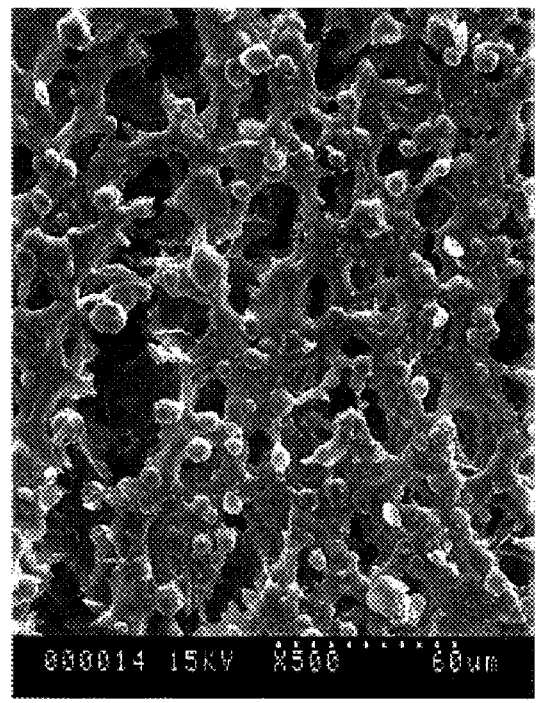
PCL1250/HDI/Phe                    PEO1000/HDI/Phe
HDI Polyurethane Degradation - Buffer
(56 day exposure)
FIG. 23

7 days  14 days  21 days

Buffer Exposure - PCL2000/LDI/Phe

FIG. 28 — Chymotrypsin Exposure - PCL1250/LDI/Phe (7 days, 14 days, 21 days)

Chymotrypsin Exposure - PCL2000/LDI/Phe

60% NaCl

70% NaCl

80% NaCl

90% NaCl

BIODEGRADABLE POLYURETHANES

INCORPORATION BY REFERENCE OF CO-PENDING APPLICATION

The subject matter of provisional application Ser. No. 60/069,327 filed Apr. 28, 1997 is incorporated herein by reference.

BACKGROUND OF THE INVENTION

1. FIELD OF THE INVENTION

The present invention relates to biodegradable material, suitable for use in such things as wound dressings as well as other applications.

2. DESCRIPTION OF THE RELATED ART

Biodegradable polymers have become increasingly important for a variety of biomedical applications including tissue engineering scaffolds. However, relatively few biodegradable, particularly elastomeric, polymers have been developed which are presently in use.

Polymeric devices which intentionally degrade and disappear upon completion of their function may mitigate the inevitable, usually negative physiologic responses (eg. fibrous encapsulation) which may limit long-term device success. Thus, an array of degradable polymers have been developed and studied for many uses.[4,5,6] However, relatively few of these degradable materials are elastomeric polymers. Rather, the majority of degradable polymers are essentially hard, brittle materials,[7] developed for drug delivery uses. With the increasing interest in tissue engineering degradable materials exhibiting a wide variety of physical properties are necessary to integrate with the various tissues of the body.

Segmented polyurethane elastomers have enjoyed wide use as biomaterials due to their excellent mechanical properties and great chemical versatility.[8] The vast majority of research devoted to the development of biomedical polyurethanes has focused on long-term applications such as vascular grafts and pacemaker lead insulators.[8] Accordingly, a significant amount of research involving the degradation of non-degradable polyurethanes has been undertaken.[9-12] The research here indicates that the urethane, urea and ester groups which may be present in the polyurethane are susceptible to limited hydrolysis (both chemical and enzymatic) in biological media. In addition, ether groups often present in the soft segment are susceptible to oxidative degradation via phagocyte-derived oxidants,[13] and this is believed to be a key component of the stress cracking phenomenon noted for pacemaker lead insulation.

Despite the progress thus far in the development of polyurethanes, relatively little research has been directed at developing intentionally degradable polyurethanes for temporary implantation. Several papers were published in the early 1980's describing polyurethane/polylactide blends as degradable materials for skin substitutes, vascular prostheses and nerve regeneration guides.[14,15] However, in these cases the polyurethane portion of the blend was non-degradable and served only to provide favorable mechanical properties. Subsequent work by Bruin et al[16] involved the synthesis of crosslinked polyurethane networks incorporating lactide or glycolide and ε-caprolactone joined by a lysine-based diisocyanate. These polymers displayed good elastomeric properties and were found to degrade within 26 weeks in vitro and 12 weeks in vivo (subcutaneous implantation in guinea pigs). However, a drawback of this approach is that the highly crosslinked polymer may not be processed by standard techniques such as solution casting or melt processing as is the case for typical linear, segmented polyurethanes. Cohn et al developed a series of elastomeric polyester-polyether-polyurethane block copolymers intended for use as surgical articles.[17] More recently, poly (phosphoester urethanes) have been synthesized by Dahiyat et al[18] for drug delivery applications. However, these polymers are relatively stiff, low tensile strength materials, which may preclude their use as elastomeric biomaterials.

It is therefore an object of the present invention to provide novel materials for use in wound dressings and other tissue engineering applications.

It is a further object of the present to provide novel polyurethanes which are biodegradable.

It is a further object of the present invention to provide novel polyurethanes of the segmented variety which are biodegradable by enzyme-mediated hydrolysis.

It is a further object of the present invention to provide a chain extender for use in the formation of biodegradable polyurethanes.

SUMMARY OF THE INVENTION

Briefly stated, the invention involves a biodegradable polyurethane material having a backbone containing at least one amino acid group, the amino acid group being in a condition rendering it recognizable by an enzyme.

In another aspect of the present invention, there is provided a method for forming a biodegradable polyurethane material comprising the steps:
  forming a chain extender having at least one amino acid group;
  reacting a polyol with a diisocyanate in suitable conditions to form a prepolymer; and
  reacting the prepolymer with the chain extender in suitable conditions to form the polyurethane with a backbone containing the amino acid group.

In still another aspect of the present invention, there is provided a method for forming a biodegradable polyurethane material comprising the steps:
  providing a chain extender having at least one amino acid group;
  reacting the chain extender together with a soft segment polyol and a diisocyanate in suitable conditions to form the polyurethane with a backbone containing the amino acid group.

In another aspect of the present invention, there is provided a chain extender useful in the formation of polyurethanes, the chain extender containing an amino acid group.

In still another aspect of the present invention, there is provided a chain extender useful in the formation of polyurethanes, according to the formula A, wherein AA is an amino acid residue CHCOO, R1 is an amino acid side group of a selected amino acid of table 1 and Y is a C2–20 substituted or unsubstituted, saturated or unsaturated linear, branched, aliphatic or aromatic complex, under 1:1 stochiometry.

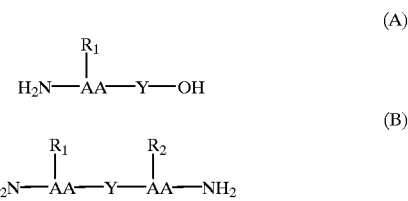

In still another aspect of the present invention, there is provided a chain extender useful in the formation of polyurethanes, according to the formula B, wherein AA is an amino acid residue CHCOO, R1 and R2 are amino acid side groups of a selected amino acid from table 1 and Y is as defined above.

In still another aspect of the present invention, there is provided a chain extender useful in the formation of polyurethanes, according to the formula C, involving an oligopeptide, wherein AA is an amino acid residue CHCOO, AB is an amino acid residue NHCHCOO, R1 is an amino acid side group and Rx represents each corresponding amino acid side group for n=1–n, where the amino acids are selected from table 1 and Y is as defined above.

$$H_2N-AA\overset{R_1}{\underset{|}{|}}-\left(AB\overset{R_x}{\underset{|}{|}}\right)_n-Y-OH \quad (C)$$

In still another aspect of the present invention, there is provided a chain extender useful in the formation of polyurethanes, according to the formula D, involving an oligopeptide, wherein AA is an amino acid residue CHCOO, AB is an amino acid residue NHCHCOO, R1 is an amino acid side group and Rx represents each corresponding amino acid side group for (n=1–n), and (m=1–m), where the amino acids are selected from table 1 and Y is as defined above.

$$H_2N-AA\overset{R_1}{\underset{|}{|}}-\left(AB\overset{R_x}{\underset{|}{|}}\right)-Y-\left(AB\overset{R_x}{\underset{|}{|}}\right)-AA\overset{R_1}{\underset{|}{|}}-NH_2 \quad (D)$$

BRIEF DESCRIPTION OF THE DRAWINGS

Several preferred embodiments of the present invention will now be described, by way of example only, with reference to the appended drawings in which:

FIG. 1 is a reaction scheme for a chain extender;

FIG. 2 is a formula for a diisocyanate;

FIG. 3 shows two formulae for polyols;

FIGS. 23 to 29 are SEM's of other biodegradable polyurethane samples;

DESCRIPTION OF THE PREFERRED EMBODIMENTS

Figure 4:
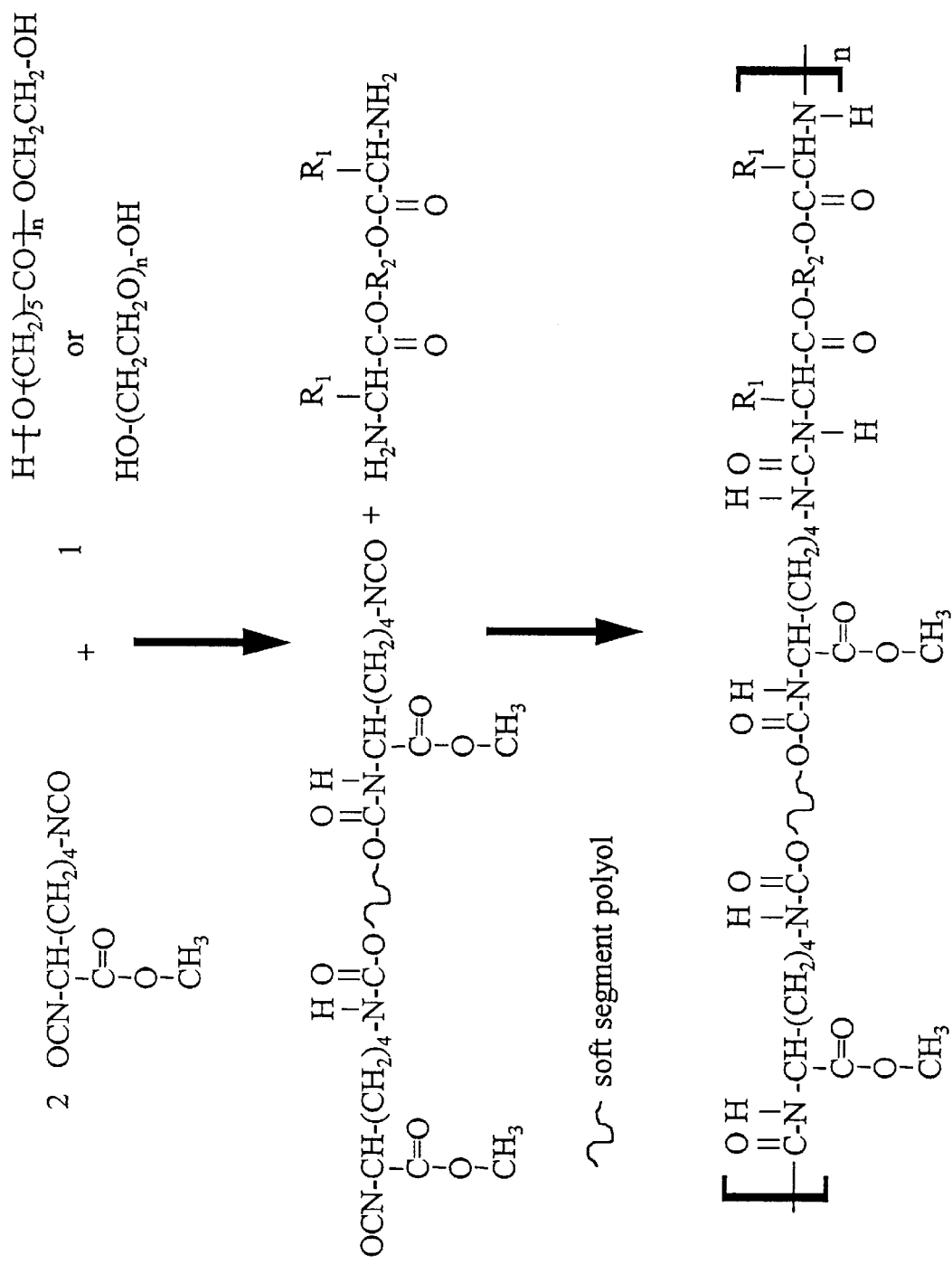
FIG. 4 is a reaction scheme for a biodegradable polyurethane.

The invention concerns a biodegradable polyurethane material having a backbone containing at least one amino acid group, the amino acid group being in a condition rendering it recognizable by a biological agent.

The term 'biological agent' is intended to refer to such things as molecules that bind or recognize other polypeptides or amino acids. The molecules, in this case, can either be floating freely in the extra cellular milieu including enzymes or be surface bound proteins such as receptors. Thus, the discussion hereinbelow, as it relates to enyzme recognition, may be applied to recognition by other such biological agents.

The term 'amino acid group' includes at least one or more amino acid residues, that is as many more as would be suitable for enzyme recognition, such as less than 20, preferably in some cases less than 10, preferably in some cases less than 5.

In another aspect of the present invention, there is provided a chain extender useful in the formation of polyurethanes, the chain extender containing an amino acid group. Preferably, the amino acid residue (or residues) in the amino acid group are arranged so that, when present in a polyurethane, the amino acid group is in a condition rendering it recognizable by an enzyme.

The chain extender may have a single amino acid group or alternatively may have a number of amino acid groups, which may be discrete and separate from one another, such as with an intermediate group there between, or alternatively adjacent one another.

Preferably, the polyurethane is a segmented polyurethane but can be of other forms which involve reaction with a chain extender, wherein the chain extender includes at least one amino acid group. The term 'chain extender' simply refers to a multi functional molecule characterized by a number of reactive termini, including an amine group or a hydroxyl group.

Preferably, there is at least one amino acid group per repeat unit of the backbone. However, it may be desirable in some cases to provide the amino acid group at random locations along the backbone and this may be done, for instance, by reacting the diisocyanate and soft segment polyol with more than one chain extender, for example two, wherein one chain extender has the amino acid group in question while the other chain extender does not. It may be further desirable to provide more than one amino acid group along the backbone and this may be achieved, for example, by reaction with two or more chain extenders where each has at least one different amino acid group.

Preferably, the amino acid group, as such, is recognizable by an endogenous enzyme in question. In particular and in the tissue reconstruction field, the amino acid group therefore consists of the naturally occurring amino acids and more particularly those of the L configuration. It will be appreciated that synthetic non-naturally occurring amino acids, as well as naturally occurring D amino acids, can be within the amino acid group provided they are also recognized by the endogenous enzyme in question.

It may also be preferable in some instances to include in the amino acid group selected D amino acids which, though not standard amino acids commonly found in proteins, nonetheless may be useful in the mediation of enzyme action. For example, selected D amino acids, when present in the amino acid group may in some cases inhibit recognition by selected endogenous enzymes. This would have the effect of controlling the degradation response by slowing it down in some cases.

Where, for example, low crystallinity is desirable in the final polyurethane, that is in the hard segment thereof, it is desirable to utilize an amino acid group having relatively bulky side chains. Of course, the make up of the amino acid group will be most desirably selected having in mind the biological environment in which the polyurethanes are to be used. Given that one environment is that of tissue reconstruction, the amino acid group is desirably selected for recognition by enzymes or other molecules that accumulate in that environment, particularly those associated with infection and inflammation, including for instance, various esterases and proteases. Because this environment includes enzymes able to recognize a single amino acid, the amino acid group can conveniently and economically consist of a single amino acid residue. For instance, the amino acid group can be a single phenylalanine residue which, in some cases, is recognized by selected common endogenous enzymes, such as certain chymotrypsin-type enzymes.

Increasing the bulk of the side chains may contribute to a weaker polymer, whereas reducing the bulk of the side chains will have the tendency of strengthening the polymer. The presence, for example, of a reactive site or a charged group on the side chain may in some cases contribute to improve mechanical characteristics by providing a cross-linking function. Moreover, the presence of a charged group on the side chain may positively influence degradation by improving hydrophilicity. The presence of charged groups may also provide improved mechanical strength by way of a 'charge cluster' type phenomenon where the charged group of one side chain associates with the charged group of another.

The mechanical properties, such as ultimate tensile strength, of polyurethanes made according to the present invention may in some cases be influenced primarily by the polyol as opposed to the hard segment as in typical segmented polyurethanes. For example, testing done on selected polyurethanes utilizing polycaprolactone-based soft segments, reveals that ultimate tensile strength tends to be increased with increasing polyol molecular weight. In such cases, it may be appropriate to utilize a soft segment having a molecular weight which ranges from about ¼ to about ⅔ of the molecular weight of the repeat unit. In another example, testing done on selected polyurethanes utilizing polyethylene oxide revealed an upper range of molecular weights, that is in the neighborhood of 600 to 1000, depending on the content of the hard segment, above which the polyurethanes have a dramatically high bulk hydrophilicity causing swelling or rapid breakdown, which may be undesirable in cases where mechanical strength and relatively longer duration degradation are important.

Suitable amino acid groups include those which have amino acid residue side chains which are themselves substantially unaltered following the polyurethane polymerization, that is they have retained their signature recognizable by the enzyme. However, there may be instances where it is appropriate to change the side chain chemically while nonetheless preserving the side chain's vulnerability to enzyme recognition.

Preferably, the polyurethane is of the type known as segmented polyurethane, which is characterized by a formation of repeating soft and hard blocks formed from such things as a polyol, a diisocyanate and a chain extender and can occur in a linear, branched or networked form. The term 'chain extender' is intended to refer to a multi-functional molecule which may be reacted with the previously synthesized prepolymer to generate a high molecular weight polyurethane for example. However, the formation of polyurethane may also be carried out using such processes as a single step process involving reaction of the chain extender with the diisocyanate and the polyol which do not involve the formation of a prepolymer.

Preferably, the amino acid group is present in the chain extender. More preferably, the amino acid group includes at least one amino acid selected from the group comprising "L" isomers of phenylalanine, lysine, as well as the other known "L" amino acid isomers and corresponding D amino acid isomers as shown in table 1.

Preferably, the diisocyanate is an amino acid-based diisocyanate, such as a lysine-based diisocyanate in the form of 2,6 diisocyanato methylcaproate (LDI), or other aliphatic diisocyanates such as 1,6 hexamethylene diisocyanate (HDI), methylene bis (p-cyclohexyl) isocyanate ($H_{12}MDI$) and cyclohexyl diisocyanate (CHDI), as well as others. The selection of the diisocyanate will have an impact on the properties of the polyurethane. For example, those diisocyanates of the aliphatic type, are known to be conformationally mobile, causing reduced packing efficiencies and lowering hard segment cohesion and crystallinity. However, selected aliphatic diisocyanates can in fact provide sufficient packing efficiency for crystallinity, such as for example the cyclohexyl diisocyanate. In some cases, it is desirable that both the chain extender and the diisocyanate are relatively symmetrical and rigid (that is regular in structure and relatively rigid in conformation), in order to encourage hard segment cohesion. The aliphatic diisocyanates generally do not possess the same degree of structural conformity as their aromatic counterparts, although the aliphatic diisocyanates are significantly more appropriate for use in biodegradable materials in view of the potential for toxic end products associated with their aromatic counterparts.

In a preferred embodiment, the chain extender is formed by reaction of an amino acid with a diol, the latter preferably being, for example, an aliphatic diol such as a 1,4 cyclohexane dimethanol, or 1,6 hexane diol. These particular diols were selected because they have been used in the synthesis of degradable polymers such as degradable polyorthoesters. However, there are a range of other diols which may be appropriate provided they possess similar satisfactory low toxicity benefits provided by the those mentioned herein above.

Preferably, the polyol is selected according to its toxicity when broken down or otherwise liberated. Two examples of appropriate polyols are polyethylene oxide and polycaprolactone diol, and others, which may be suitable in some cases, are shown in table 2.

The segmented polyurethane made according to one aspect of the present invention is significant in that it provides a chain extender with a number of hydrolytically reactive (and therefore cleavable) sites therein, which in a preferred case are ester sites though they may alternatively be amide sites or a combination of the two. In the latter case, the amide sites can be formed by reacting the carboxyl site of an amino acid with an amine site of a reactant. The reactant may be another amino acid such as lysine which has two amine groups. For example, lysine may be reacted with two other lysine groups to result in a oligopeptide with two unaltered lysine side chains and which contributes two cleavable amide sites.

The constituents making up the polyurethane may be selected so as to be biodegradable to substantially nontoxic constituents. The term 'substantially non-toxic' is intended to refer to materials which when present in the body are physically tolerable and, more specifically, do not cause appreciable cell death (cytotoxicity) or detrimental alteration of normal cell function (such as mutagenic response). This would of course depend on the area of application. For example, detailed in vivo tests may be appropriate to determine the effect of the material on the neighboring cells.

Depending on the formation route selected, these cleavable sites may be regular along the length of the chain extender, thereby giving the segmented polyurethane a biodegradability which is, by some measure, 'predictable'. Biodegradability is influenced by a number of factors, including crystallinity.

Selected examples of segmented polyurethane formed according to the present invention have exhibited relatively low hard segment crystallinity which is attributed to, among other things, the relatively large side chains present in the amino acid groups of the chain extender. The crystallinity that has been seen appears in the soft segment of those segmented polyurethanes formed with soft segments containing polycaprolactone. It is believed that the greater the crystallinity (in both the hard and soft segments), the lower the degradability of the polyurethane.

The hydrophilicity of the polymer may also influence the degradability, that is the extent to which water is accessible to the polymer matrix. In those cases where the chain extender has enzyme recognizable side groups, the access of the water to the surface of the matrix should increase the rate at which the enzyme can catalyze the reaction between water and the hydrolyzable cleavage sites.

The number of cleavage sites will also influence the biodegradability, the higher the number of sites generally, the greater the rate of degradation. Preferably, the cleavable site is an ester site and more preferably, this cleavable ester site is adjacent one or more amino acids. This is significant because it provides the segmented polyurethane with cleavable sites in its chain extender which may be arranged to be recognizable by enzymes.

In tests conducted on selected embodiments of the present invention, segmented polyurethane formed from chain extenders having a repeating single amino acid were found to be recognizable by an enzyme, causing significant surface modification.

Therefore, selected embodiments of the present invention may provide not only predictable biodegradability but also biodegradability under the action of certain enzymes. It follows that the susceptibility of the segmented polyurethane may also be tailored to be sensitive to certain enzymes which may be specific to different amino acid arrangements. In this case, repeating combinations of amino acids may be formed in the chain extender so that the ester sites are cleaved by enzymes which recognize only that given combination of amino acids, or amide sites as the case may be.

In one aspect of the present invention, therefore, the amino acid group is recognizable by an enzyme in order to cause cleavage at a site adjacent the amino acid, such as the ester or the amide site. For this recognition to take place, in one example, the side group should be substantially unaltered. In other words, amino acids preferred for inclusion in the polyurethanes are those "L" configured naturally occurring amino acids, and particularly those recognized by proteases and other infection- and inflammation-related enzymes prevalent at tissue reconstruction sites in the body including various esterases.

In one embodiment, the amino acid group includes more than one amino acid. In this case, the amino acids may be joined together in a chain to form an oligopeptide, that is, for example, by reacting the amine group of amino acids with the carboxyl group of adjacent amino acids, leaving the side groups as signatures of the amino acid residues, thereby representing, to the enzyme, the same composite amino acid signature as a particular oligopeptide sequence bearing the same amino acid residues. Conveniently, this can be done by reacting the carboxyl termini of two moles of the so-formed oligopeptide sequence with the hydroxyl functions of one mole of a di-hydroxyl bearing group such as a diol, for example 1,4 cyclohexane dimethanol, thereby to form as a consequence a diamine chain extender, containing two hydrolyzable ester linkages.

However, the chain extender in some cases may in fact have a single amine group and a single hydroxyl group, formed when a 1:1 stoichiometric reaction is made between the amino acid group and the diol.

The invention also concerns a method for forming a biodegradable polyurethane material comprising the steps:

providing a chain extender having at least one amino acid group;

reacting the chain extender with a polyol (also known as a soft segment polyol) and a diisocyanate in suitable conditions to form the polyurethane with a backbone containing the amino acid group.

In one embodiment, the diisocyanate is reacted with the soft segment polyol, in suitable conditions to form a prepolymer; and the prepolymer is then reacted with the chain extender, again in suitable conditions, to form the polyurethane.

In one embodiment, introduction of hydrolyzable ester linkages into the polyurethane using amino acids confers biodegradability to the polymers. Chain extenders are synthesized via an esterification reaction between the carboxyl terminals of two amino acids and the hydroxy functions of a non-toxic diol, such as 1,4 cyclohexane dimethanol. A variety of amino acids may be employed in this reaction scheme to yield diamine chain extenders with varying compositions, as seen in FIG. 1. The likely final degradation products of the chain extender portion of the polymer, due to hydrolytic cleavage of the ester and urea functionalities, are the amino acids and the diol (all of which should be substantially non-toxic.) In addition, a substantially non-toxic diisocyanate is obtained and employed in the polyurethane polymerization to avoid the use of diisocyanates which may liberate toxic and potentially carcinogenic diamines or other products upon polymer degradation. The diisocyanate of FIG. 2, when liberated during polymer degradation, should react with water ultimately to yield the original L-lysine methyl ester or L-lysine. A soft segment is utilized in the form of polyethylene oxide or polycaprolactone diol as shown in FIG. 3. Material properties can be altered by the selection of both the type of soft segment molecule and the molecular weight of the molecule. Using these constituents, the polyurethane systems can be carried out in a two step, prepolymer/chain extension scheme to yield a linear, relatively high molecular weight polymer as shown in FIG. 4, or a one step scheme as discussed herein above.

Alternatively, multi-functional components could be employed to produce a cross-linked network, and hence non-linear, segmented polyurethane. This for example, could be achieved by the use of a branched complex bearing more than two hydroxyl groups, such as for example a triol. In another case, certain amino acids may also contribute to the formation of a networked polymer. Lysine for example, having an amine group on its side chain, may be reacted with such sites as a isocyanate group on the diisocyanate. Additionally, several lysines may be present in the amino acid group thereby providing potential bonding sites between each corresponding amine and another site such as an isocyanate group. Thus, such multi-functional components allow for the formation of nonlinear segmented polyurethane.

Thus, in one embodiment, substantially non-toxic degradable polyurethane can be formed from amino acids and substantially non-toxic diols, in such a manner to be useful as biomaterials for a variety of applications such as artificial skin, wound dressings, tissue engineering scaffolds and the like. The polyurethane materials may be formed by melt and solvent processing techniques such as dissolving the polymer into a solvent, pouring the mixture onto a flat sheet or into a mold and thereafter evaporating the solvent, with the polymer remaining therein. Other melt processing techniques may be available by melting a blank of polyurethane and manipulating it into a shape as desired, including tubes and fibers. A porous polyurethane may be formed in a number of ways, including the addition of a gas (typically carbon dioxide) into the polymerization reaction, trapping the gas into the polymer structure. Alternatively, salt crystals can be added to the solvent polymer mixture during casting wherein the salt is not dissolved. The mixture may be deposited into a dish causing the solvent to evaporate, with the salt material being removed by washing with water.

The polyurethane material formed herein may be used in a number of different forms and in a range of applications, both in the biomedical field and others. The material may be fabricated by casting or other molding techniques to form a substrate, which can be used along or combined with other substrates to form homogenous multi-layered materials. Such multilayered homogeneous polyurethane materials may be formed with layers having different degrees of degradability. Such substrates may range in thickness from about 1 micron to about 5 millimeters for applications suitable for skin repair and the like and perhaps more particularly from about 10 microns to 3.5 millimeters, and still perhaps more particularly from about 50 microns to about 2 millimeters. Of course, the thinner the substrate, the more care is needed in its handling.

In the case of bone regeneration and the like, the polyurethane material may range in thickness from about 1 cm to about 5 cm or higher, depending on the specific application, including the dimensions of the bone being regenerated.

Alternatively, the layered polyurethane material may be combined with other naturally occurring materials such as plant materials or biological materials such as prepared animal tissue (in acellularized form or otherwise), cell layers and the like. The layered polyurethane material may also be combined with other non-naturally occurring materials such as other polymer layers, fabric layers and the like.

Such uni- and multi-layered materials utilizing the polyurethane materials described herein may have a number of useful applications in the biomedical field, such as to function as a tissue scaffolding material, a wound dressing or the like.

The polyurethane material may also be formed as an impermeable film or bulk material or in a porous form and may be a suitable site to establish a cell layer, for example to be used in the seeding of regenerative tissue layers, in such cases as in the healing of skin wounds and the like.

The polyurethane material is believed to be especially useful for use as a tissue engineering scaffold which is a structure for the growth or regeneration of tissue. The polyurethane lends itself to such uses since the enzyme catalyzed degradation may in some cases work concurrently with the migration or growth of cells into the material, while desirably degrading in the process into its substantially non-toxic constituents. For example, testing of polyurethane made according to the present invention, has indicated significant surface modification in the presence of an enzyme in solution, and which is believed to be caused by enzyme catalyzed cleavage, gradually opening the matrix to cell migration as a result. It is also possible, in some cases, that cells migrating into or located adjacent the matrix, may themselves exude proteolytic enzymes which will likewise mediate further hydrolytic cleavage.

Such tissue engineering scaffolds may have applications in the regeneration of skin and other organs, bone, cartilage, ligaments, tendons, bladder and other tissue. The polyurethane material may also be useful in the production of sutures, which require good mechanical strength, and drug release matrices, in view of their need for non-toxic degradability. The polyurethane material may also be useful for other non-biomedical applications, where degradability into substantially non-toxic constituents is an asset. The polyurethane material lends itself to sterilization by such techniques as gamma radiation and ethylene oxide treatments.

Embodiments of the present invention will be described with reference to the following Examples which are presented for illustrative purposes only and are not intended to limit the scope of the invention.

EXAMPLE 1

(HDI MATERIAL)

Materials

L-phenylalanine and 1,4 cyclohexane dimethanol were obtained from Aldrich Chemicals, Milwaukee Wis. and used as received. The p-toluene sulfonic acid monohydrate was obtained from Sigma Chemical Co., St. Louis Mo. Toluene used to suspend the reactants in the chain extender synthesis reaction was obtained from BDH Chemicals, Mississauga ON. Ethanol used in the chain extender purification was obtained from Commercial Alcohols Inc., Brampton ON.

Polycaprolactone diol (molecular weights 530, 1250 and 2000) and polyethylene oxide (molecular weights 600, 1000 and 2000) were obtained from Aldrich Chemicals. The soft segment diols were placed in a vacuum oven at 60 C for at least 48 h to remove residual water prior to reaction. Hexamethylene diisocyanate (HDI) was obtained from Fluka Chemie AG, Buchs Switzerland and was distilled under vacuum prior to use. Stannous octoate, used as a catalyst for the prepolymer reaction, was obtained from Sigma. Polyurethane solvents dimethyl formamide (anhydrous grade DMF) and chloroform were obtained from Aldrich and ACP Chemicals Inc., Montreal PQ respectively.

Chain Extender Synthesis and Characterization

Figure 5:
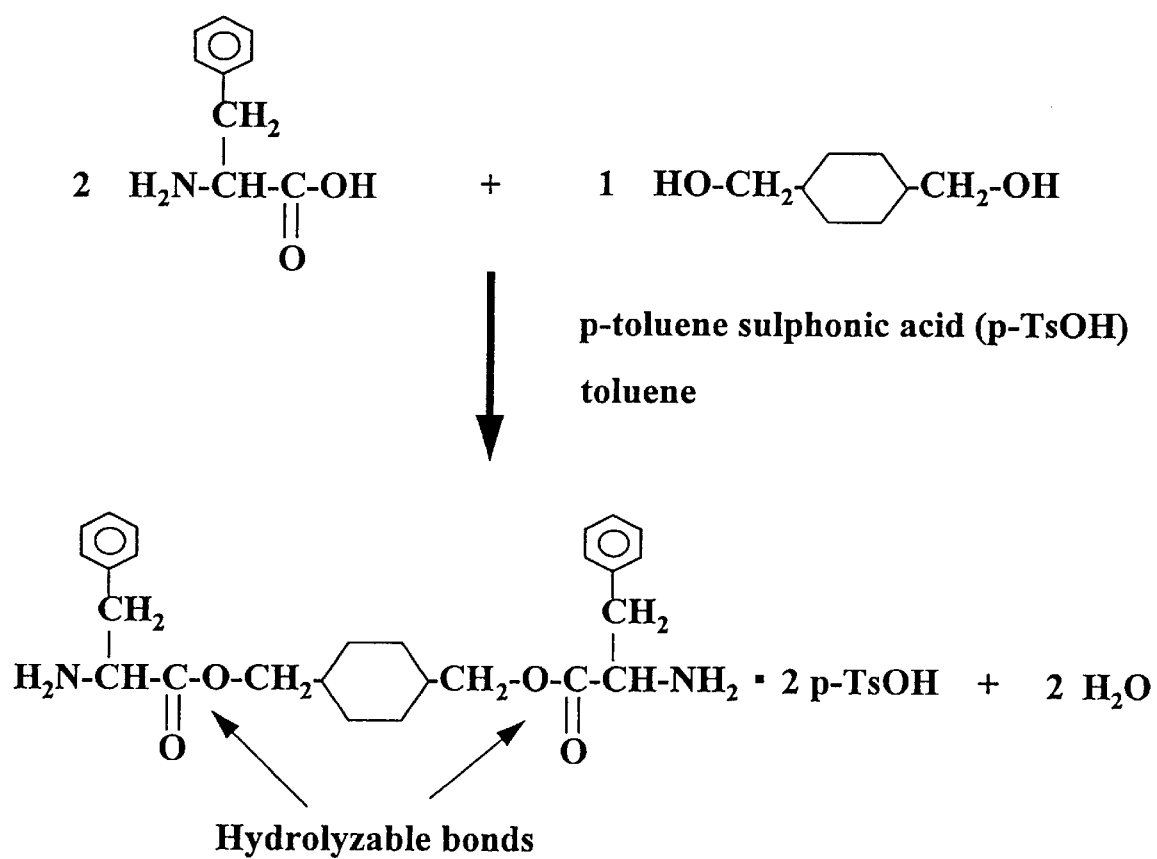
FIG. 5 is a reaction scheme for another chain extender.

The method of Huang et al[22] was employed to carry out the chain extender synthesis. The method utilizes a Fischer esterification reaction between the carboxyl function of two moles of L-phenylalanine and the hydroxyl functions of one mole of 1,4 cyclohexane dimethanol to produce a diester diamine chain extender (FIG. 5). The reaction was carried out in the presence of p-toluene sulfonic acid in toluene under refluxing conditions. The equilibrium reaction was driven towards completion by trapping the evolved water and is continued until no more water was collected. The crude product (in the form of a tosylate salt) was then dried under vacuum at 80 C. for 48 h to remove residual toluene and then ground into a fine powder. The light brown powder was subsequently washed five times by stirring the powder in a ~15% (w/v) suspension of anhydrous ethanol followed by filtering the purified solid. Finally, the solid was washed with 60 C. distilled water and filtered to remove any residual, unreacted phenylalanine. The bright white purified solid was then dried under vacuum at 80 C. for 48 h.

The tosylate salt of the chain extender was converted to the free diamine form as follows. The salt was dissolved in distilled water at 90 C. and a molar excess of potassium carbonate was added slowly. The diamine formed a yellow oil which solidified to a waxy solid upon cooling. The solid diamine was filtered, washed with distilled water and dried under vacuum at room temperature for 48 h. The dried solid was then dissolved in chloroform at approximately 20% w/v and filtered to remove any insoluble impurities. Finally, the chloroform was evaporated off and the resulting light yellow solid was stored in a desiccator until use.

The success of the synthesis reaction as well as the purification scheme was monitored by nuclear magnetic resonance (NMR) spectroscopy, Fourier transform infrared spectroscopy (FTIR) and elemental analysis. NMR samples were dissolved in $d_6$ dimethyl sulfoxide at 1% w/v and analyzed in a 400 MHZ Bruker spectrometer. FTIR samples were either analyzed neat or prepared as a mull in paraffin oil and placed between two NaCl crystals and analyzed in a Nicolet Impact 410 spectrometer. Elemental analysis was carried out by Galbraith Laboratories, Knoxville Tenn. to determine elemental composition and allow comparison to theoretical prediction.

Polymer Synthesis and Film Casting

Polyurethanes were synthesized via the standard, two-step reaction procedure.[23] Briefly, HDI was reacted with either polyethylene oxide (PEO) or polycaprolactone diol (PCL) at a 2:1 molar ratio in anhydrous DMF at 85 C. The prepolymer reaction was catalyzed using 0.1% stannous octoate and allowed to proceed for 150 minutes. The reaction temperature was lowered to 25 C., the chain extender was added at a 1:1 molar ratio with the prepolymer and allowed to react for approximately 18 h. The polymers were precipitated in saturated aqueous KCl and vacuum filtered. The polymer was then immersed in distilled water for 48 h, refiltered and dried under vacuum at 60 C. for 48 h. Finally, the polymers were stored in a desiccator until use.

Solid films were prepared by solution casting. The PCL-based polyurethanes were dissolved in chloroform at a concentration of 3% w/v and the PEO-based polyurethanes were dissolved in DMF at 3% w/v. The solution (20 mL) was poured into a level 5 cm Teflon casting dish. The DMF solutions were cast in an oven at 55 C. while the chloroform solutions were cast at room temperature. The dishes were covered to prevent dust from contaminating the film and excessively fast casting, which can result in surface defects. The cast films were removed from the casting dishes and dried under vacuum at 60 C. for 48 h to remove residual solvent.

The polymer nomenclature used here is based on the type and molecular weight of the soft segment and the chain extender. For example, PCL1250/Phe refers to a polyurethane consisting of 1250 molecular weight PCL, chain extended with the phenylalanine-based chain extender. All of the polyurethanes employ HDI as the diisocyanate component.

Polyurethane Characterization

Gel permeation chromatography (GPC) was employed to determine polyurethane molecular weights. The polymers were dissolved at 0.25% w/v in the GPC carrier solvent (0.1 M LiBr in DMF) and 200 $\mu$L samples were injected. The number and weight average molecular weights were determined from the retention time data with Waters Baseline™ software (Waters Chromatography, Mississauga ON. using a calibration curve generated with polystyrene standards (Varian, Sunnyvale Calif.).

Differential scanning calorimetry (DSC) was performed using a Thermal Analyst 2100 thermal analyzer at the Institute for Materials Research (McMaster University, Hamilton ON) to determine the phase segregated morphology of the polyurethanes. Scan rates of 15 C. per minute were employed over a temperature range of −100 to 250 C.

The bulk hydrophilicity of the polyurethanes was quantified by determining the amount of water that each polymer absorbed at room temperature. Films 100 $\mu$m thick were cast as described above and four 1×1 cm pieces of each polymer were cut out and weighed. The samples were then placed in 20 mL glass scintillation vials and 20 mL of distilled water were added. After 48 h, the samples were removed, weighed and then dried under vacuum and reweighed. The increase in weight due to water absorption was calculated as the difference between the hydrated and subsequently dried samples since some of the polymers exhibited significant weight loss over the 2 day experiment.

Figure 6:
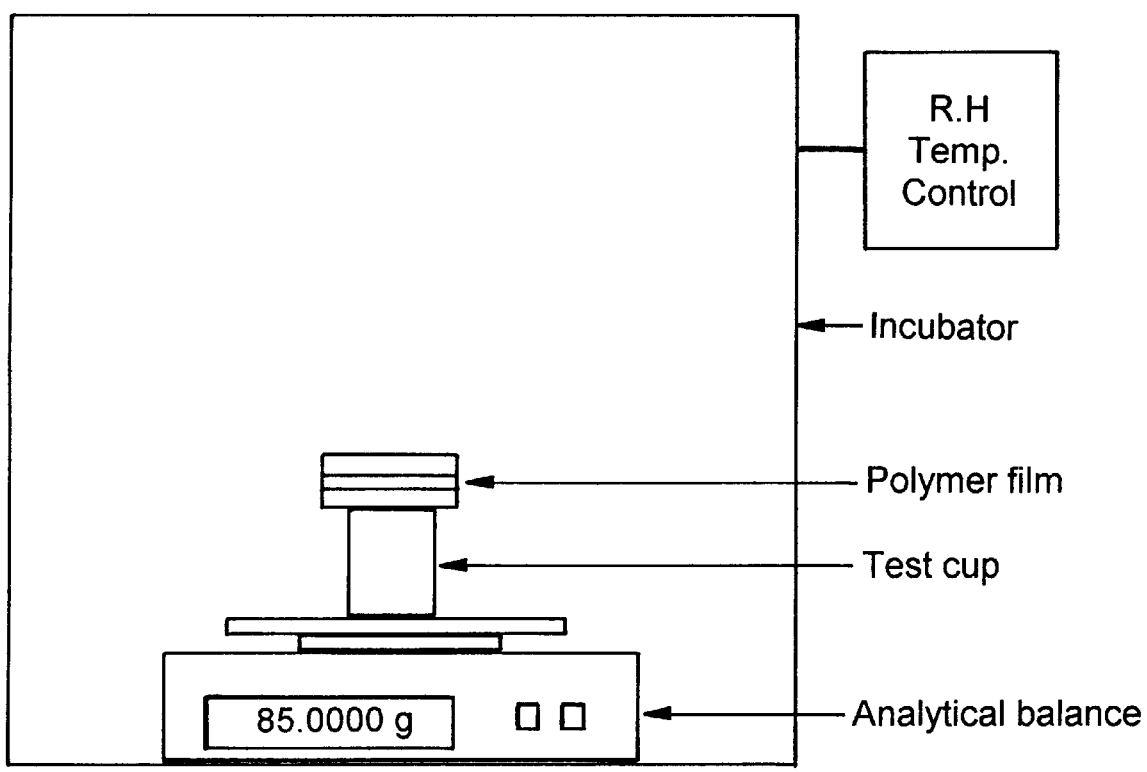
FIG. 6 is a water vapor permeance testing apparatus.

Water vapor permeability of the polyurethane films was determined using a modification of the method of Queen et al.[24] The apparatus (FIG. 6) consists of: an aluminum dish which holds 5 mL of water; an analytical balance used to measure weight loss due to water permeation; an incubator which allows for control of the test environment humidity and temperature; a thermometer/hygrometer; and a sample of thin polymer film which is fastened over the cup surface. The mass readings of the analytical scale are collected every 15 min for 10 h and stored via computer. The rate of weight loss due to water permeation through the polymer film is calculated by linear regression of a plot of weight loss vs. time. This value may then be converted to a water vapor permeance (WVP) by the following equation.

$$WVP = \frac{M}{A \cdot \Delta P} g/m^2 h kPa$$

Where m is the experimentally determined rate of water transport in g/h, A is the area of polymer available for transport in m2 and P is the water vapor pressure difference across the polymer film in kPa. The water vapor pressure inside the cup is assumed to be 100% while the vapor pressure outside the cup is controlled by the incubator. All of the water vapor permeance tests were performed at 35 C. and 60% relative humidity.

Water contact angles were measured on cast films of 100 μm thickness. Prior to measurement the cast films were placed under vacuum at 60 C. for 14 h to remove any volatile impurities. The samples were then washed with a 0.1% detergent solution (Alconox, Alconox Inc., New York N.Y.), rinsed with distilled water and dried at 55 C. for 2 h. The samples were then washed with 1,1,2-trichlorotrifluoroethane (Aldrich) to remove silicon-containing surface contaminants and dried under vacuum at 60 C. overnight. The advancing and receding water contact angles were measured by goniometer using the sessile drop technique. Ten measurements of both advancing and receding angles were made.

X-ray photoelectron spectroscopy (XPS) was performed at the Surface Science Laboratory at the University of Toronto. Take-off angles of 90, 30 and 20 were employed to obtain a compositional depth profile of the polymer surfaces. Films cast as above were prepared as for the contact angle studies. Low resolution spectra were performed to generate elemental composition data while high resolution analysis of the carbon 1s peak was performed to determine the relative contributions of the urethane, urea, ester and ether groups.

Degradation Experiments

An in vitro degradation study was carried out over 8 weeks to determine if the synthesized polyurethanes would degrade in buffer and, if so, how fast the degradation would occur. Two polymers (PCL1250/Phe and PEO1000/Phe) were assayed for degradation in 0.1 M TBS (tri-buffered saline), pH 8.0 at 37 C. by measuring weight loss and change in molecular weight at various time points over the experiment. The PCL1250/Phe and PEO1000/Phe polyurethanes were chosen for the degradation study because they had relatively good mechanical properties as assessed qualitatively and also had similar soft segment contents to allow for comparison. Buffer pH of 8.0 was employed in order to allow for comparative study with the data from Example 2 below, which involves degradation in the presence of a proteolytic enzyme.

Films cast as described above were cut into 1×1 cm pieces and weighed (approx. 30 mg). The samples were then placed in a 20 mL glass scintillation vial and immersed in 20 mL of 0.1 M TBS containing 0.02% w/v $NaN_3$ and placed in a shaking water bath at 37 C. Four samples were removed at each experimental time interval, dried for 14 h under vacuum at 60 C. and weighed for mass loss. In addition, three samples per polymer were assayed for molecular weight changes by GPC and one sample per polymer was evaluated for alteration in surface morphology by scanning electron microscopy (SEM). For SEM evaluation, the samples were dehydrated through graded ethanol, dried in a $CO_2$ critical point dryer, mounted on aluminum specimen stubs, coated with gold and examined in the scanning electron microscope.

RESULTS AND DISCUSSION

Chain Extender Characterization

Figure 7:
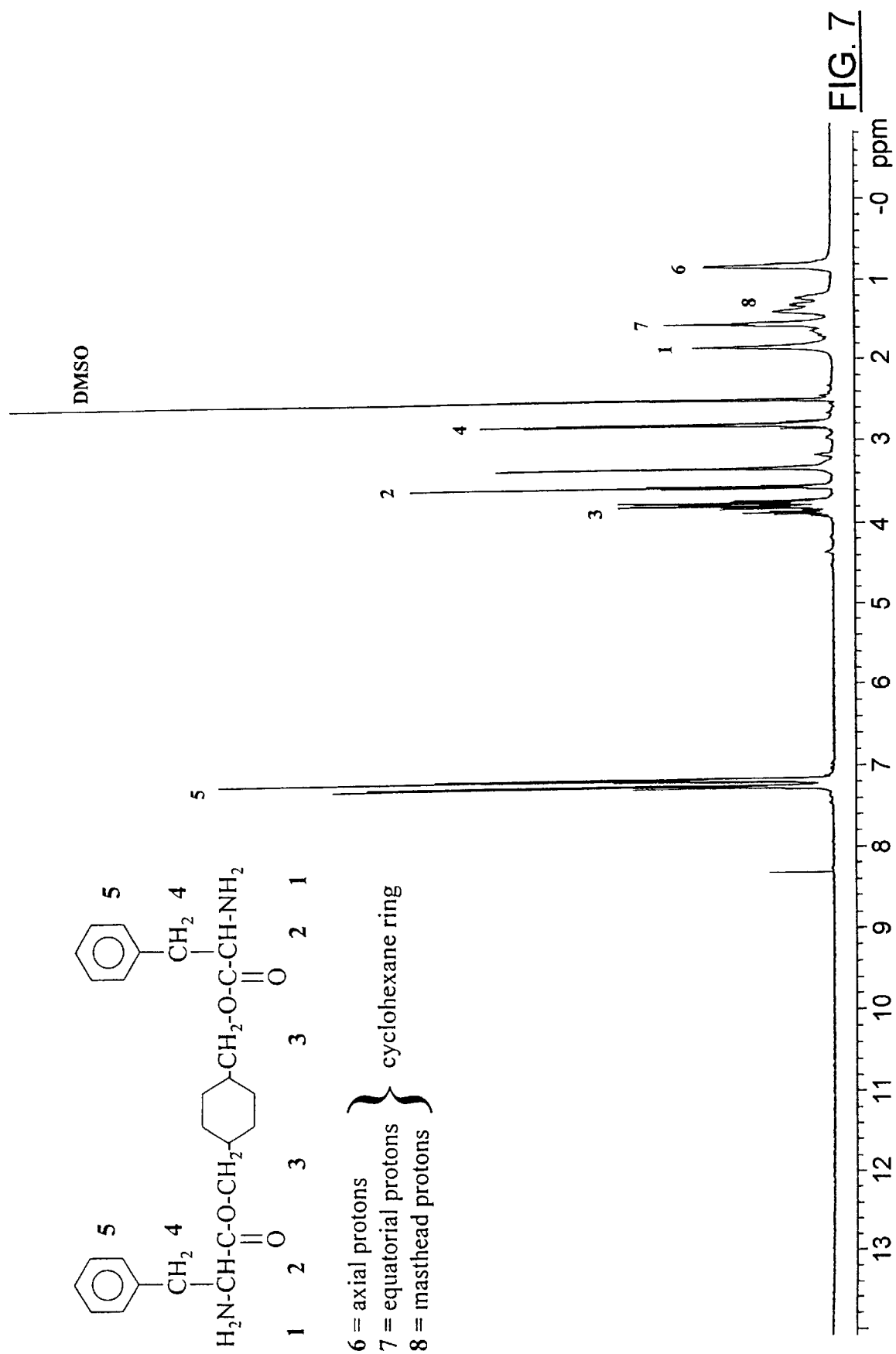
FIG. 7 is an H-NMR spectrum of the chain extender of FIG. 4.

The proton NMR spectrum of the chain extender synthesized is shown in FIG. 7. The peak assignments were aided by obtaining spectra of the constituent molecules alone (1,4 cyclohexane dimethanol, L-phenylalanine and p-toluene sulfonic acid). The multiplets centered at 3.8 ppm were attributed to the methylene protons of 1,4 cyclohexane dimethanol which are adjacent to the ester functionalities. Two sets of multiplets are observed here because the cyclohexane dimethanol received is a mixture of cis and trans isomers (60% cis and 40% trans) and thus the methylene protons are in a slightly different electronic environment in each conformation. Since these protons are adjacent to the reactive site, they may be utilized to assess the success of the synthesis reaction. It was found that these methylene protons yield two multiplets centered at 3.2 ppm for unreacted 1,4 cyclohexane dimethanol when the protons are adjacent to the reactive hydroxyl groups. It appears that the esterification reaction results in a shift of these peaks from 3.2 to 3.8 ppm due to the presence of the ester group which has a greater deshielding effect, in comparison to the hydroxyl group, on the methylene protons. FIG. 7 clearly shows the presence of the multiplets at 3.8 ppm indicating the success of the synthesis reaction, however, it appears that some unreacted hydroxyl functionalities remain as indicated by the small peaks centered at 3.2 ppm.

Quantization of the relative amount of unreacted to reacted hydroxyl groups is complicated by the presence of an overlapping water peak at ~3.3 ppm, however, it is apparent that the great majority of the methylene protons of 1,4 cyclohexane dimethanol are adjacent to ester groups as anticipated (rough calculation indicates approximately 8% of the methylene protons are adjacent to unreacted hydroxyl groups). The presence of a small amount of unreacted hydroxyl groups may indicate either the synthesis reaction was incomplete, yielding an amine/hydroxyl molecule rather than a diamine or that limited hydrolysis occurred during the conversion of the tosylate salt to the free diamine, which is carried out in aqueous solution. Comparison of integrated peak areas, in general, indicates close agreement with stoichiometric prediction suggesting that the synthesis reaction and purification technique were successful.

Figure 8:
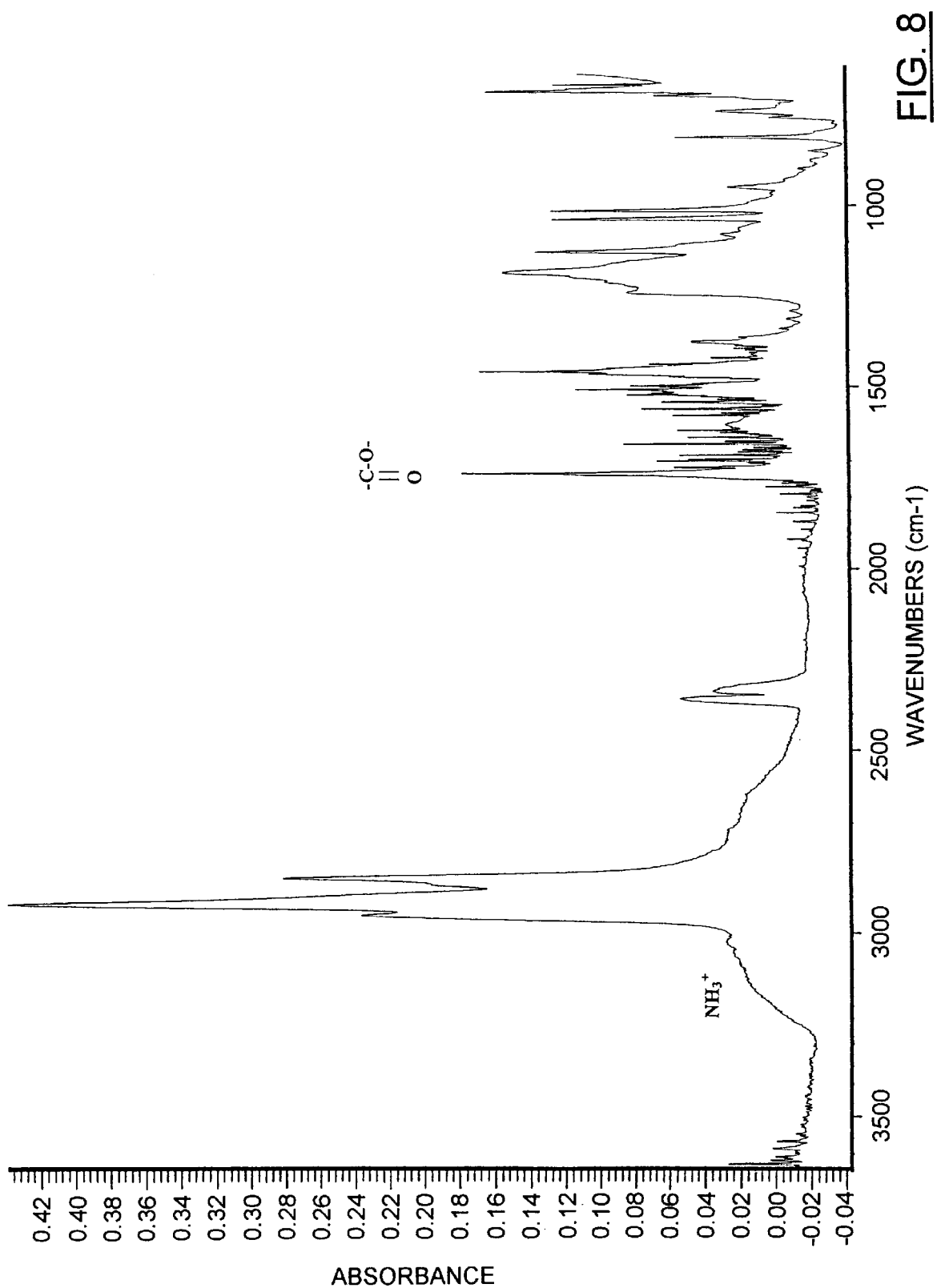
FIG. 8 is an FTIR spectrum of tosylate salt of the chain extender of FIG. 4.
Figure 9:
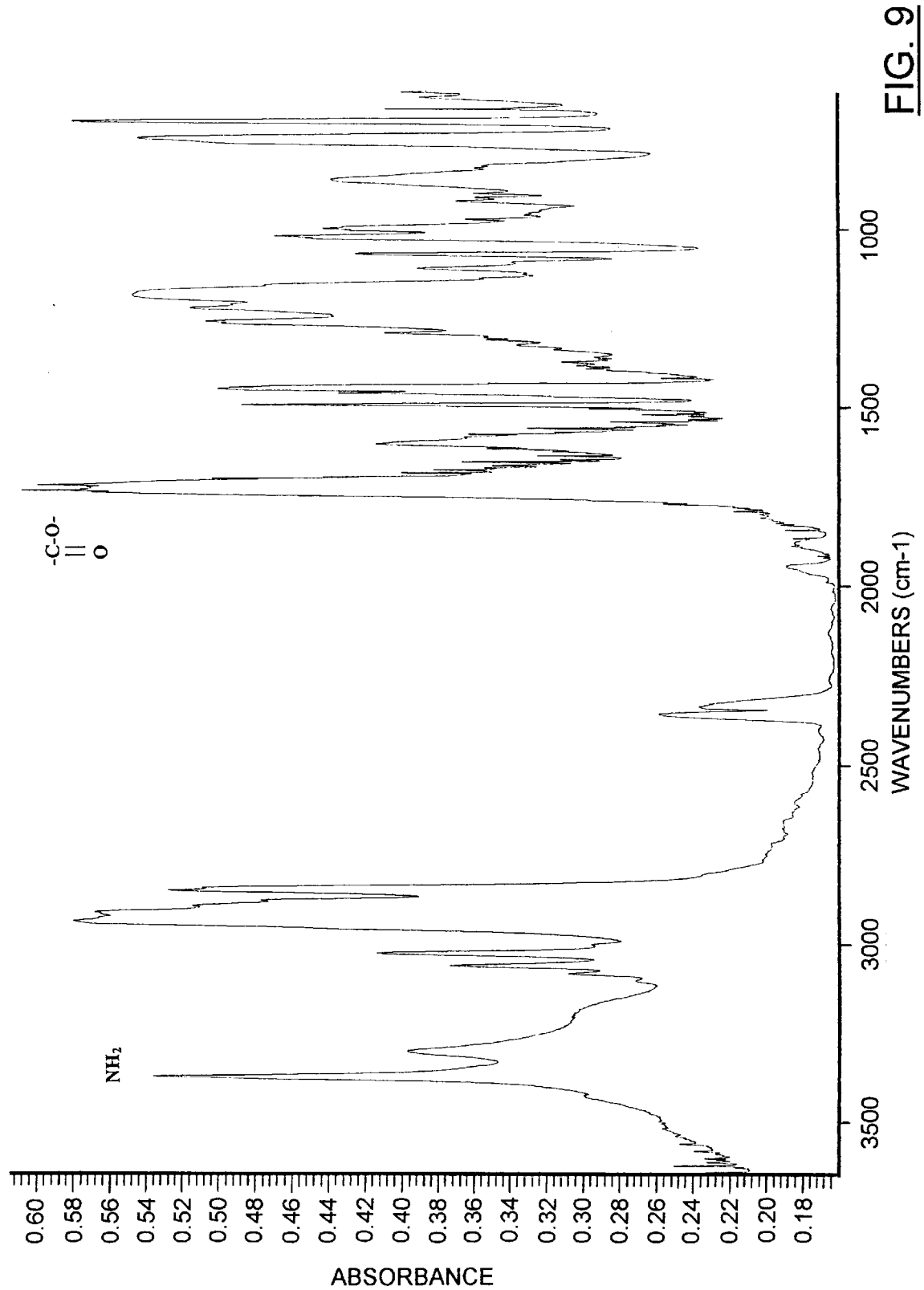
FIG. 9 is an FTR spectrum of a free diamine form of the chain extender of FIG. 4.

FTIR analysis (FIGS. 8 and 9) was carried out to determine the presence of specific functional groups in the synthesized chain extender, particularly ester and amine groups. In addition, the success of the reaction to generate the free diamine (FIG. 9) from the tosylate salt (FIG. 8) was followed by FTIR. The spectra of both the tosylate salt and free diamine show a strong peak at 1735 $cm^{-1}$ which is attributed to the presence of ester functionalities indicating the success of the synthesis reaction. In addition, no significant hydroxyl peak is noted in the region of 3000–3500 $cm^{-1}$ in either spectra which would result from the presence of unreacted 1,4 cyclohexane dimethanol hydroxyl groups. However, the presence of a broad double peak centered at ~3300 $cm^{-1}$, in FIG. 8, which was attributed to the amine functional groups of the free diamine would overlap any small hydroxyl peak which may appear as suggested by NMR analysis. Successful generation of the free diamine may be inferred from comparison of FIGS. 8 and 9. It is evident that the tosylate salt yields a broad peak centered at 2900 $cm^{-1}$ (FIG. 8) which may be attributable to the $NH_3+$ group while this peak disappears and the amine peak at ~3300 $cm^{-1}$ appears indicating successful conversion (FIG. 9).

Additional evidence of the success of the synthesis reaction and purification procedure was provided by elemental analysis. Table 3 shows the elemental composition data for both the tosylate salt and free diamine forms of the chain extender, compared to theoretical prediction. In both cases the measured and predicted atomic weight percents are within 5% indicating the success of the reaction and that the chain extender was obtained at good purity.

Polyurethane Molecular Weights

The number average molecular weights of the synthesized polyurethanes are given in Table 4. The molecular weights in all cases are high enough to impart adequate elastomeric behavior for the solid films,[8] ranging from approximately 25,000 to 140,000. In general, the PCL-based polyurethanes exhibited higher molecular weights than the PEO-based ones. This difference likely results from the presence of water contamination in the hydrophilic PEO soft segment. Water may react with the isocyanate functionalities of the prepolymer to yield the corresponding amines which are capable of competitively reacting with remaining isocyanate groups.[23] Thus, the water side reaction will alter the synthesis reaction stoichiometry and limit chain extension, limiting molecular weight. The gross difference in molecular weight between the PCL and PEO-based polyurethanes may be expected to impact on both the mechanical and degradation properties of the polymers.

Differential Scanning Calorimetry (DSC)

The DSC data obtained for the five polyurethanes is shown in Table 5. None of the polymers exhibited detectable hard segment crystallization but rather displayed a distinct hard segment glass transition in the temperature range of 67 to 77.4 C. Thus, the hard segments are in all cases amorphous and glassy at room or body temperature. The mobile aliphatic diisocyanate employed here[25] as well as the presence of bulky side chains on the chain extender may preclude the efficient chain packing necessary for hard segment crystallization.[26] Polyurethanes containing noncrystalline hard segments, as is generally the case for aliphatics, tend to exhibit reduced tensile strength. However, tensile properties may also be greatly affected by other polymer characteristics such as the micro domain morphology and the ability of the hard segments to hydrogen bond.[27] For example, van Bogart et al[28] observed higher ultimate tensile strength values for a series of aliphatic polyurethanes in comparison to aromatic ones and this was attributed to presence of smaller or more interconnected hard segment domains in the aliphatics as determined by small-angle X-ray scattering (SAXS).

No general trend of hard segment glass transition temperature with soft segment molecular weight was noted for the PCL-based polyurethanes. In contrast, the hard segment $T_g$ does increase with increasing PEO content from 67 to 74.2 C. This trend indicates that increasing phase separation between hard and soft segment occurs with increasing PEO molecular weight. Increased phase separation would be expected to reduce the amount of low $T_g$ soft segment material present in the hard segment domains and thus lead to increased hard segment $T_g$ values.

The soft segment glass transition temperature was observed to decrease consistently with increasing soft segment molecular weight for both the PCL and PEO-based polyurethanes. The trend of decreasing soft segment $T_g$ likely results from increasing phase separation which usually occurs with increasing segment length.[29] In addition, increasing hard segment content, which results from decreasing soft segment molecular weight, leads to decreased mobility of the soft segment domains and thus results in increased soft segment $T_g$ values.[30] Since some degree of phase mixing is inevitable, the pure PCL and PEO $T_g$s of −62 and −67 C. are unobtainable and may be regarded as lower limits.

Interestingly, soft segment crystallization was observed for PCL1250/Phe and PCL2000/Phe, but not for PCL530/Phe or the PEO-based polyurethanes. This result suggests that a minimum chain length is required to facilitate PCL crystallization. The PCL530 polymer soft segment may be interrupted too frequently by hard segments to align into a crystal structure. In addition, increased phase mixing, as inferred by increased soft segment $T_g$, in PCL530/Phe would also inhibit efficient chain ordering necessary for crystallization. Increasing soft segment crystal melt temperature was observed with increasing PCL molecular weight. Once again, this may be attributed to increased phase separation afforded by increasing soft segment chain length as well as increasing soft segment content. For reference, the crystal melt temperature of pure PCL is approximately 57 C,[7] and thus some phase mixing results in a significant depression in soft segment $T_m$. It is apparent that with relatively minor modifications in chemistry it is possible to greatly vary the resulting polyurethane morphology ranging from completely amorphous to semicrystalline.

Water Absorption

Figure 10:
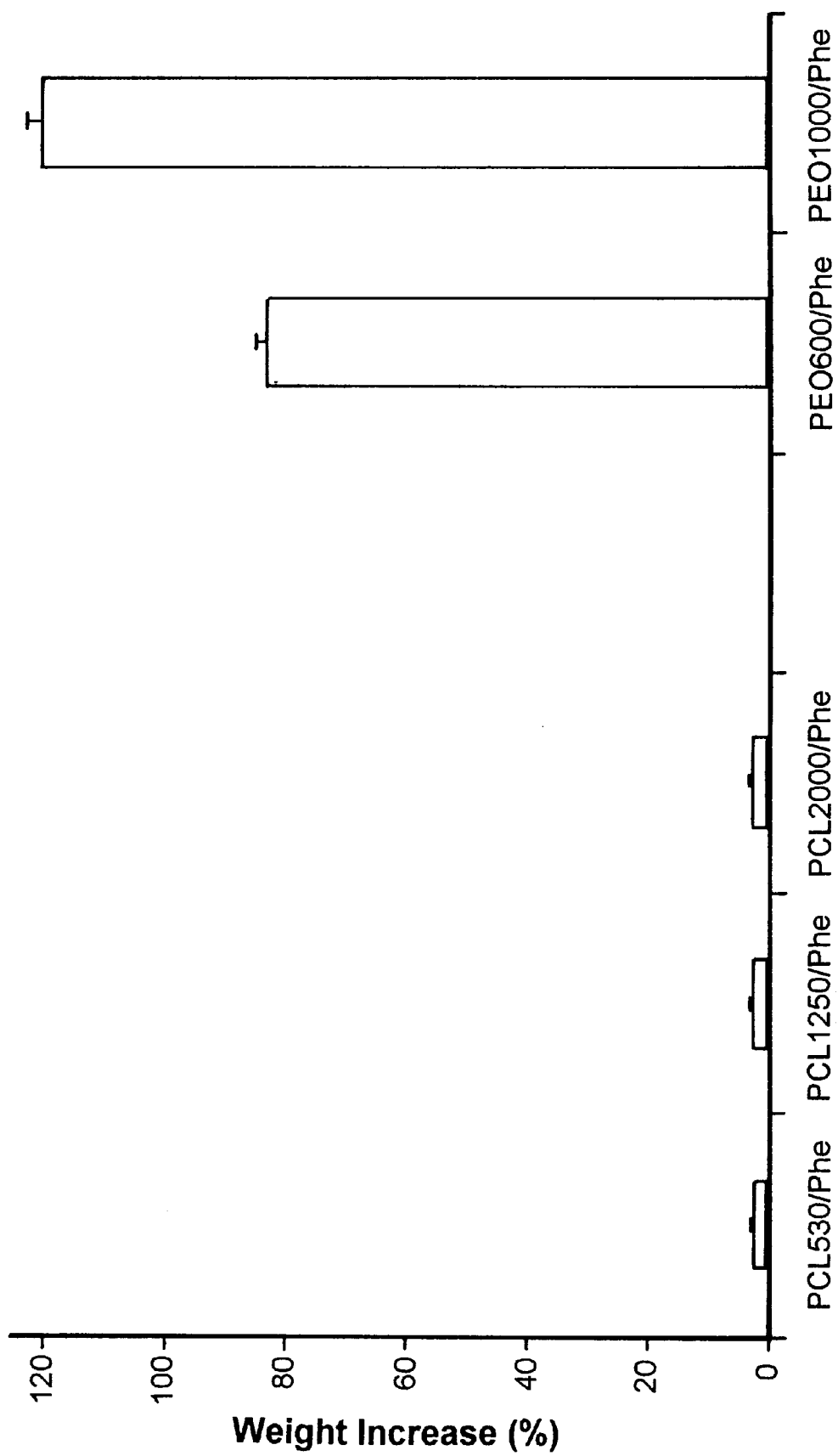
FIG. 10 are selected water absorption values for biodegradable polyurethanes.

Water absorption was measured to determine polyurethane bulk hydrophilicity as this was expected to have a substantial impact on degradation kinetics. The absorption data is shown in FIG. 10 (wherein the data points represent the mean value of four observations and the error bars represent 1 standard deviation). As expected, the polyurethanes containing hydrophilic PEO soft segment exhibited substantially higher levels of water absorption than the PCL-based ones indicating greater bulk hydrophilicity. In addition, increasing PEO molecular weight results in increasing water absorption, likely due to increased PEO content in the polyurethane. Increasing the PEO molecular weight beyond 1000, as in the case of PEO2000/Phe, resulted in a water soluble polyurethane indicating that the relative PEO content can dramatically effect the resulting bulk hydrophilicity of the polyurethane.

In contrast, the PCL-based polyurethanes showed no significant dependence of PCL molecular weight on water absorption. Rather, these polymers displayed an essentially constant level of water absorption (~3%) even though their microphase segregated morphology differed quite markedly as measured by DSC. The essentially hydrophobic PCL-based polyurethanes would thus be expected to degrade at a significantly reduced rate in comparison to the hydrophilic PEO-based polymers and would therefore be better suited to longer residence time applications.

Water Vapor Permeance (WVP)

It was anticipated that the synthesized polyurethanes may be useful materials for wound dressing applications, since several non-degradable polyurethane wound dressings are currently commercially available and in wide use.[31] One of the major functions of a wound dressing is to control evaporative water loss from the wound site. Excessive water loss may lead to wound bed dehydration and delayed healing.[32] However, fluid buildup at the wound site may lead to pain, leakage and bacterial infiltration.[24] Therefore, it is desirable to maintain an intermediate level of fluid retention, and a material's ability to do this can be assessed in vitro. However, it must be noted that a wide range of water vapor permeances are clinically useful since different types of wounds will generate exudate at different rates and a variety of commercial dressings are available.[31] The water vapor permeabilities of two commercially available polyurethane wound dressings (Opsite™ and Tegaderm™) were measured as a reference for the experimental polyurethanes.

Table 6 lists the measured water vapor permeance values for the experimental polyurethanes as well as Opsite™ and Tegaderm™. As expected, the hydrophilic PEO-based polyurethanes displayed significantly higher WVP values in comparison to the more hydrophobic PCL-based ones. The enhanced WVP for the PEO-based polyurethanes is presumably a result of the highly hydrophilic nature of these polymers. In addition, increasing PEO molecular weight results in increasing WVP, again due to increasing hydrophilicity as noted by the water absorption experiments. In contrast, increasing PCL molecular weight was observed to result in decreasing WVP, although the bulk hydrophilicity was essentially constant. This behavior may result from increasing soft segment crystallinity with increasing PCL molecular weight as observed by DSC. Increasing polymer crystallinity will result in a less porous and thus less permeable material leading to reduced WVP values. It may be noted that the PCL-based polyurethanes yield WVP values similar to the commercial dressings and thus may find application in cases where Opsite™ and Tegaderm™ are presently employed. The PEO-based polymers exhibit significantly higher WVPs indicating that they may be applicable to highly exudative wounds such as burns.[33]

Contact Angles

Figure 11:
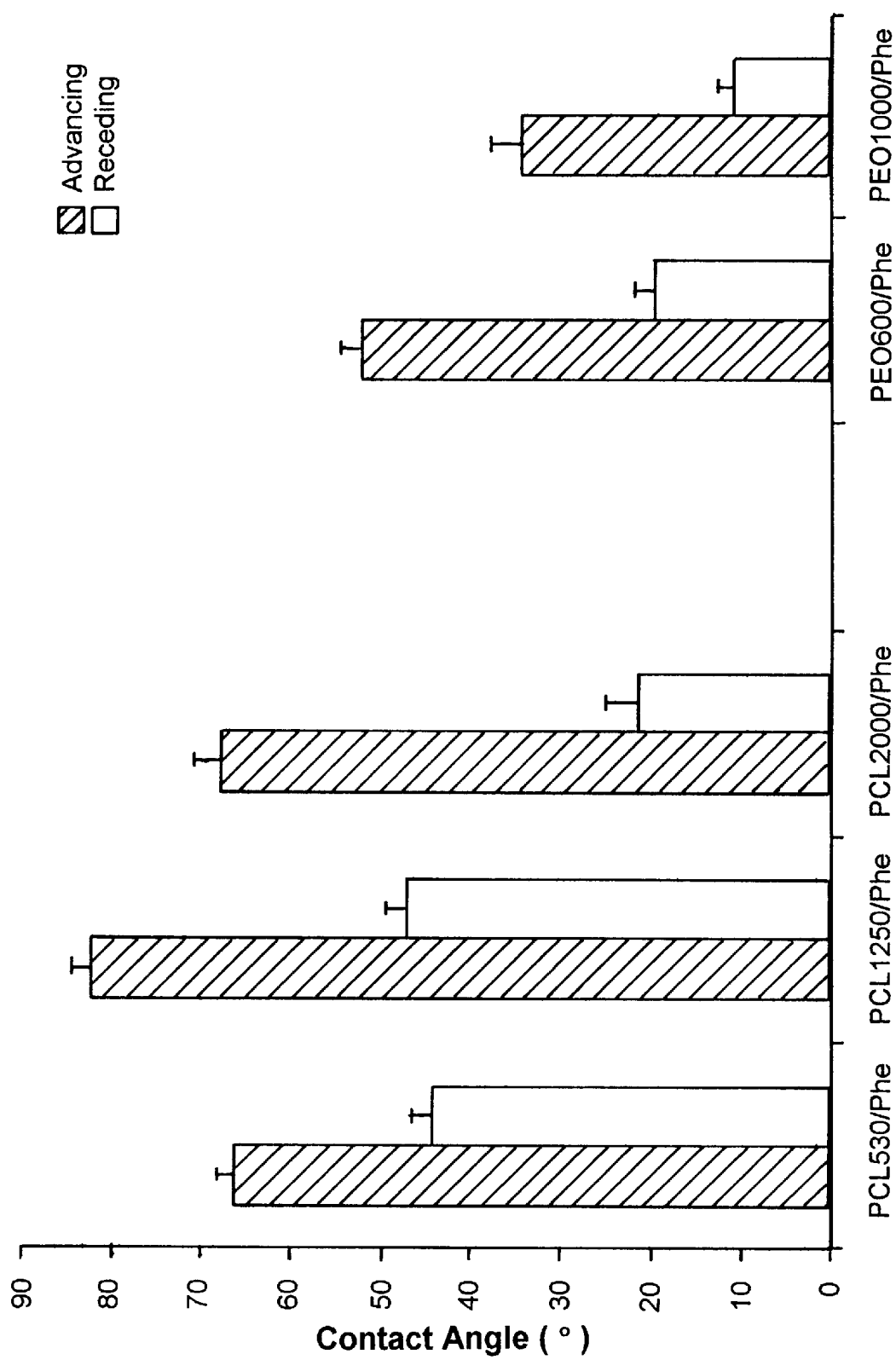
FIG. 11 are advancing and receding water contact angle measurements on biodegradable polyurethanes.

FIG. 11 shows the advancing and receding water contact angles for the experimental polyurethanes (wherein the data points represent the mean value of ten observations and the error bars represent 1 standard deviation). The PEO-based polyurethanes exhibit reduced advancing and receding contact angles in comparison to the PCL-based ones, in agreement with the bulk hydrophilicity results obtained from the water absorption studies. Again, increasing PEO molecular weight results in decreasing advancing and receding contact angles suggesting increasing surface hydrophilicity. However, no simple trend can be noted for the PCL-based polyurethanes with PCL molecular weight. In this case, increasing PCL content may be expected to result in decreasing surface hydrophilicity due to depletion of the relative amount of polar hard segment. This is not observed, rather both advancing and receding contact angles increase from PCL530/Phe to PCL1250/Phe but then decrease for PCL2000/Phe. Therefore, it appears that other factors may be involved in determining the polymers' surface energetics. For example, the degree of phase mixing, which may affect the surface distribution of the micro domains, and the level of soft segment crystallinity are two factors that could impact on polymer surface energy. The overall effect of these factors are difficult to predict. However, DSC showed increasing soft segment crystallinity with increasing PCL molecular weight and thus increasing surface tension may be expected to result which would lead to decreasing contact angles. In contrast, increasing phase mixing was noted with decreasing PCL molecular weight and this might be expected to lead to increasing polar hard segment content at the surface and thus increasing surface tension reflected in decreasing contact angles. Thus, the combination of the above effects may result in the observed results. At low PCL content (eg. PCL530/Phe), the increased phase mixing may lead to relatively low contact angles while at high PCL content (eg. PCL2000/Phe) the increase in polymer crystallinity dominates and results in decreased contact angles. The intermediate case of PCL1250/Phe could then be expected to yield the highest contact angles reflecting the lowest surface energy.

All of the polymers exhibit significant contact angle hysteresis. The PCL-based polyurethanes display increasing hysteresis with increasing PCL molecular weight while the opposite trend is noted for the PEO-based polyurethanes. Hysteresis has been interpreted to result from rapid reorientation of the surface region to favor the polar hard segment domains in response to the introduction of the water droplet.26 Minimization of the interfacial free energy of the system using a polar liquid such as water dictates requires the polar groups of the polymer are preferentially oriented towards the surface. However, contact angle hysteresis may also result from surface roughness and surface absorption during the experiment.[34] Since the measured absorption was essentially constant for the PCL-based polyurethanes, the differences in hysteresis may not be attributed to this effect. In addition, SEM observation of the surfaces showed no qualitatively significant differences in terms of roughness. Therefore, the increasing hysteresis noted with increasing PCL content may be best explained by an increasing ability to reorient in response to the water droplet. Increased phase separation may allow for greater alteration in surface chemistry, however, the increased crystallinity also noted with increased PCL molecular weight would be expected to reduce the conformational mobility of the surface region. Thus, the origin of the trend of increasing hysteresis with increasing PCL content is unclear. The corresponding trend of decreasing hysteresis with increasing PEO content may result from the differences in polymer hydrophilicity in this case since the PEO soft segment is highly hydrophilic and thus the driving force for rearrangement is reduced here. It must be noted however, that the difficulty in measuring contact angle values less than 20, as for the receding angles, makes any definitive evaluations difficult here.

X-ray Photoelectron Spectroscopy (XPS)

The XPS data measured using take-off angles of 90, 30 and 20 (relative to the surface) is given in Table 7. Since nitrogen should be present only in the hard segment of the polyurethanes, it can be used to examine the hard segment content of the surface regions. All of the polyurethanes show lower nitrogen content as the depth of analysis is reduced, suggesting that the surface regions of the polymers are soft segment enriched. Soft segment surface enrichment in the high vacuum environment of XPS has been well documented for a variety of segmented polyurethanes.[35,36] It is believed that a predominance of the relatively apolar soft segments at the polymer surface serves to minimize the surface free energy of the system in a vacuum environment. A greater depth dependence of nitrogen is observed with increasing soft segment molecular weight in agreement with the DSC data suggesting increasing phase separation with increasing soft segment molecular weight. Increasing phase separation can be expected to lead to increasingly "pure" surface soft segment content while phase mixing will result in the inclusion of hard segment "impurities" in the surface region.

High resolution analysis of the C 1s peak showed a decrease in contribution of the ester/urethane/urea component of the C 1s peak as the sampling depth decreased for all of the polymers. Thus, the high resolution carbon data provides additional evidence for hard segment depletion at the surface of the polyurethanes in vacuo. The prevalence of soft segment domains at the polymer surface may be expected to reduce the rate of hydrolysis of the polyurethanes since the ester containing chain extender is present in the hard domain. This would be particularly important for the relatively hydrophobic PCL-based polyurethanes which may be expected to exhibit surface-limited degradation. However, previous studies have demonstrated that polyurethanes are capable of reorienting in a polar aqueous environment to enhance hard segment surface distribution.[37] Therefore, since any degradable polymer intended for biomedical use will be placed into an essentially aqueous environment, surface enrichment of hard segment is likely.

Degradation Experiments

Figure 12:
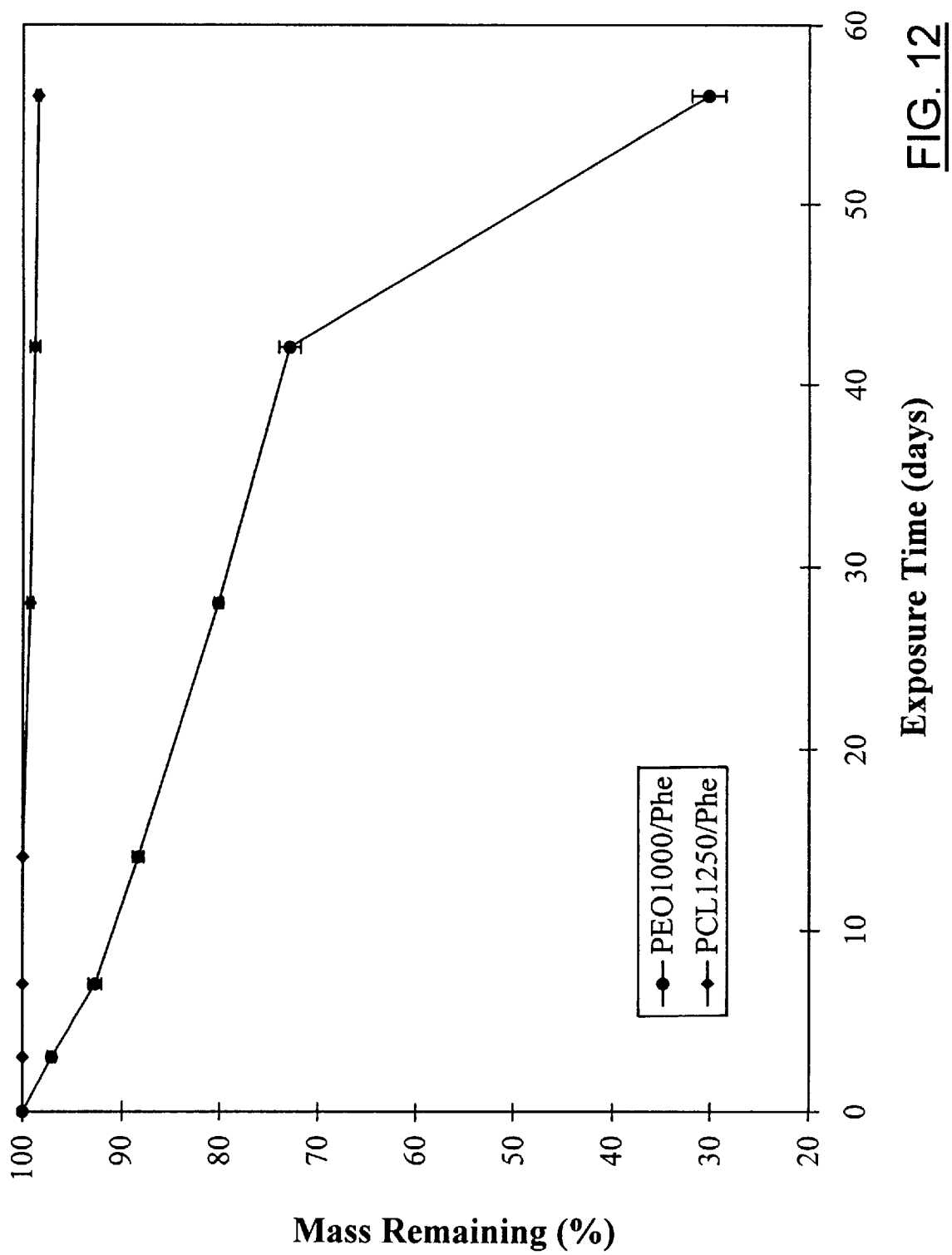
FIG. 12 is a plot showing mass loss data with buffer incubation.

The mass loss data collected for PEO1000/Phe and PCL1250/Phe is shown in FIG. 12 (wherein the data points represent the mean value of four observations and the error bars represent 1 standard deviation). It is apparent that PEO1000/Phe exhibited substantial and progressive mass loss, while PCL1250/Phe showed only minor mass loss, over the 56 day experimental period. After 56 days exposure to buffer, PEO1000/Phe retained approximately 30% of its initial mass and became extremely fragile and difficult to handle without fragmenting. In contrast, PCL1250/Phe retained approximately 98% of its original mass and also retained its qualitative mechanical stability after 56 days. Since the hard segment chemistry of each polyurethane was identical and the hard segment contents were also similar (PEO1000/Phe 37%, PCL1250/Phe 32%), it can be hypothesized that the substantial difference in weight loss, resulting from buffer incubation, is attributable to the different soft segments.

In discussing the differences in mass loss, it is noted that the process of mass loss will depend not only on hydrolysis of the polymer backbone but also the rate of diffusion or release of the degradation products generated (oligomers and/or monomers). Therefore, several factors may contribute to the difference in mass loss noted here. First, differences in polymer morphology may impact on the degradation rate. DSC measurements indicated that PEO1000/Phe was completely amorphous while PCL1250/Phe was semicrystalline. A greater free volume is associated with the amorphous phase making it more accessible to water than the crystalline phase. Consequently, amorphous polymers generally degrade much more quickly than semicrystalline polymers, as noted here.

For semicrystalline polymers, such as PCL1250/Phe, the amorphous regions degrade first, followed by a progressive erosion of the crystalline regions.[38] However, since neither polymer exhibits hard segment crystallization, and the amorphous hard segment contains the labile ester bonds via the chain extender, the presence of crystalline structure in the soft segment for PCL1250/Phe may not be expected to significantly affect the rate of hydrolysis of the polymer. Rather, other material properties may be of greater importance. For example, the drastic difference in the molecular weights of the two polyurethanes may be expected to affect the relative rates of degradation. The higher molecular weight PCL1250/Phe (~140,000) would be expected to require a greater degree of hydrolytic cleavage to permit the release of oligomeric degradation products, leading to mass loss, than PEO1000/Phe (molecular weight ~25,000). In this respect, the solubilities of the respective degradation products will also substantially impact on the mass loss characteristics observed. The degradation products released from the hydrophilic PEO1000/Phe are presumably much more soluble than those liberated from PCL1250/Phe and are thus more easily able to diffuse from the solid, leading to mass loss.

Finally, the dramatic difference in water uptake noted for the two polyurethanes may impact greatly on the rate of mass loss in several ways. Since hydrolysis requires the reaction between water and the labile ester bond, the reaction velocity will depend on the concentrations of both "reactants" in the polymer matrix. Therefore, polymers capable of absorbing a significant amount of water, such as PEO1000/Phe, generally degrade more rapidly than those which absorb little water (eg. PCL1250/Phe).[39] In this case, the water uptake measured for PEO1000/Phe was approximately 40 times greater than for PCL1250/Phe, presumably resulting in a substantial difference in the rate of hydrolysis. In addition to the effect on the rate of hydrolysis, the level of water uptake may also be hypothesized to impact on the rate of mass loss through alterations in the swollen polymer matrix. A high degree of water uptake will generally lead to a swollen polymer matrix which contains greater free volume for mass transfer to occur into and out of the solid.[39] This may then lead to high rate of release of soluble degradation products from the bulk of the material. Hydrophobic materials are likely to swell to a lesser degree inhibiting transport of degradation products. Therefore, the difference in mass loss noted in FIG. 12 for the two polyurethanes may be a result of both differences in water uptake and initial molecular weight.

Figure 13:
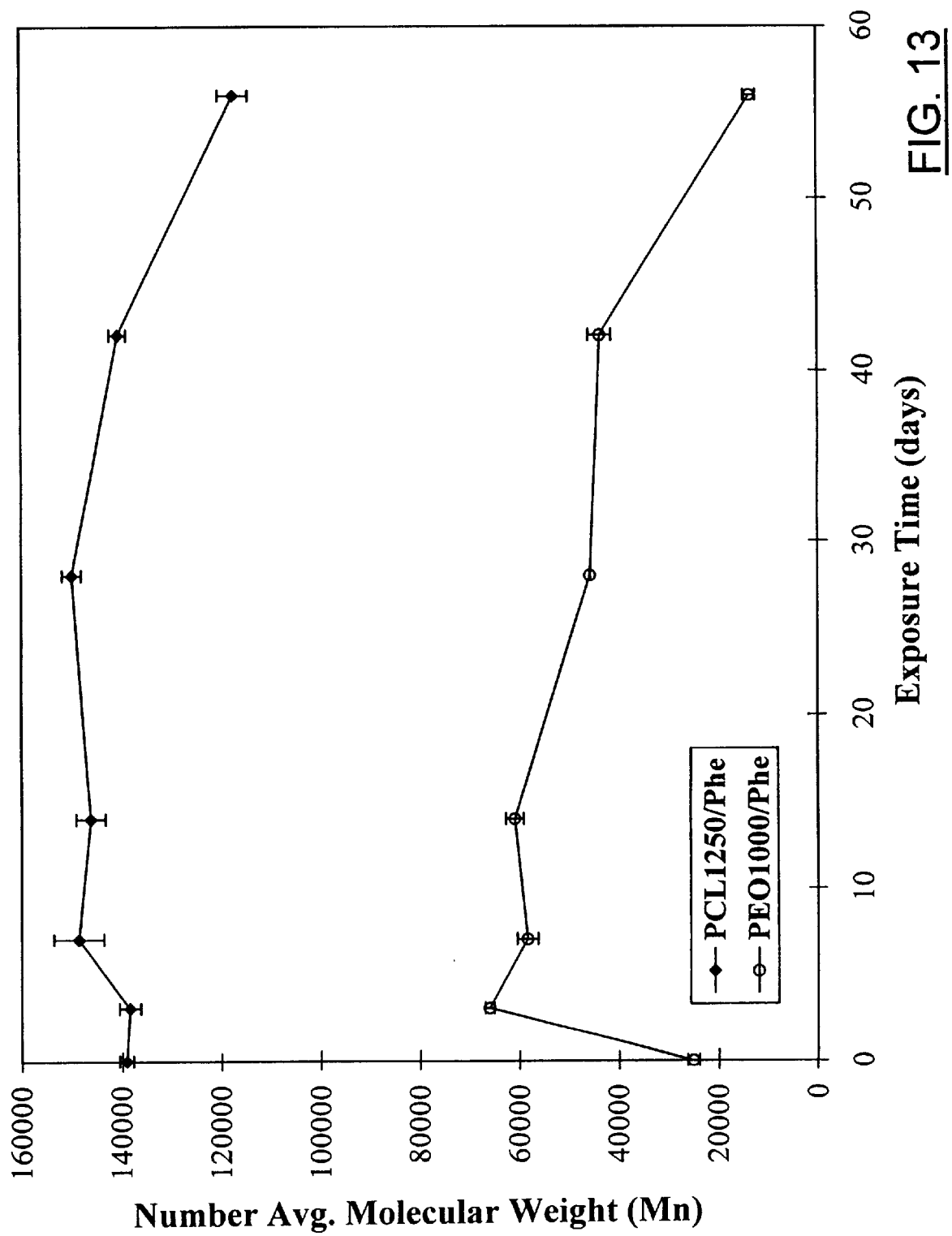
FIG. 13 is a plot of molecular weight changes with buffer incubation.

The effect of buffer incubation on polyurethane number average molecular weight is shown in FIG. 13 (wherein the data points represent the mean value of three observations and the error bars represent 1 standard deviation). Both polyurethanes exhibit an initial increase in molecular weight which is hypothesized to result from leaching of low molecular weight polymer. A concurrent drop in the polydispersity of the molecular weight distribution supports this hypothesis. The leaching process appears to be complete within 7 days for PCL1250/Phe and 3 days for PEO1000/Phe. The more rapid leaching process noted for PEO1000/Phe is presumably due to the greater bulk hydrophilicity of this polymer in comparison to PCL1250/Phe which may lead to more soluble low molecular weight fractions.

After the initial leaching period, PCL1250/Phe exhibits essentially no molecular weight changes up to 4 week buffer exposure times and then displays decreasing molecular weight with exposure time up to 56 days. The delayed and modest reduction in molecular weight for PCL1250/Phe corresponds well with the weight loss data shown in FIG. 12, and is hypothesized to result from the relative hydrophobicity of this polymer. The low level of water uptake noted for PCL1250/Phe may result in relatively slow hydrolysis and thus delayed reduction in molecular weight in comparison to PEO1000/Phe. In contrast, PEO1000/Phe displays immediate and successive decrease in molecular weight subsequent to the initial leaching phase, suggesting relatively rapid bulk hydrolysis. Again, the immediate and substantial loss in molecular weight correlates with the weight loss data and is presumed to result from the substantial bulk hydrophilicity of this polyurethane.

Figure 14:
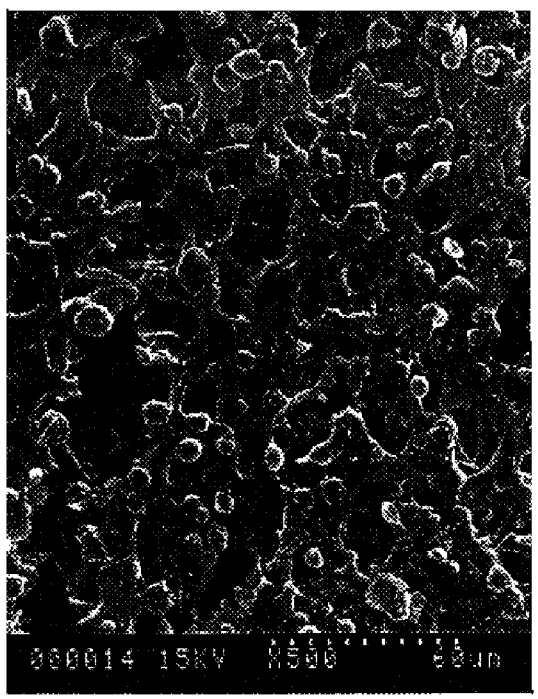
FIG. 14 is a scanning electron micrograph (SEM) of one biodegradable polyurethane sample.

Scanning electron microscopic evaluation of the degraded polyurethane surfaces at 56 days buffer exposure highlights the difference in the degradation behavior of the two polymers. FIG. 14 shows the PEO1000/Phe surface after 56 day exposure to buffer. The initial surface was smooth and nonporous while after 56 days in buffer, the polymer displays marked porosity and fracturing. The extremely porous morphology noted by SEM corresponds with the substantial weight loss noted for PEO1000/Phe at 56 days (~70% mass loss), in addition to the reduction in molecular weight, as noted by GPC, suggests relatively rapid bulk hydrolysis mechanism is responsible for the polymer degradation.

Figure 15:
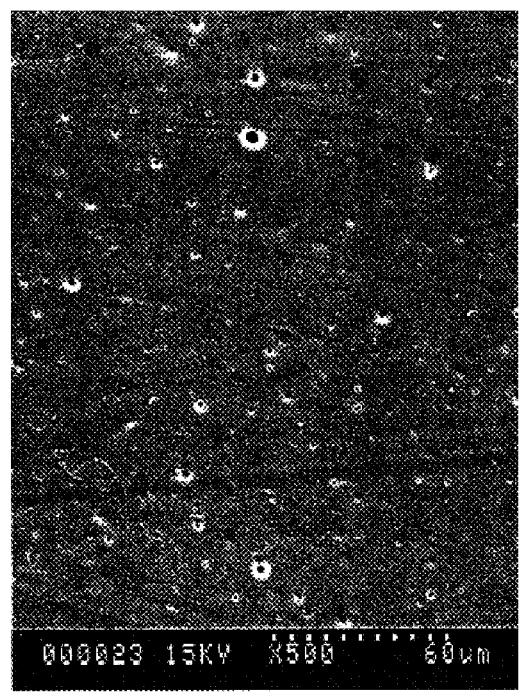
FIG. 15 is an SEM of another biodegradable polyurethane sample.

In comparison, the SEM of PCL1250/Phe after 56 day buffer exposure (FIG. 15) does not exhibit any apparent surface alteration compared to the initially cast film, which was essentially smooth. The PCL1250/Phe samples generally showed little surface structure. The lines apparent on the film sample result from small surface abrasions present on the casting dishes. In addition, a significant number of pores are present in the PCL1250/Phe film which are believed to result from the presence of air bubbles in the casting solution or the excessively fast vaporization of the chloroform casting solvent in the final stages of casting. The general lack of surface alteration for PCL1250/Phe is in agreement with the minor mass loss and molecular weight reduction described previously and suggests that little degradation occurs for this polyurethane over the 56 day experimental period.

Further SEM studies of the cross-sectional morphology of the degrading polyurethanes would be of interest to better elucidate the possible formation of bulk pore formation due to hydrolysis as has been noted for other degradable polymers.[39] In addition, DSC evaluation of the degrading polyurethanes may be employed to determine possible alterations in the microphase morphology. In particular, DSC may indicate changes in relative crystallinity for the semicrystalline PCL1250/Phe which may be expected as a result of preferential amorphous phase degradation.

In conclusion, a phenylalanine-based chain extender was synthesized and utilized to generate a series of degradable polyurethane elastomers. It was found that alteration of the soft segment type (PCL or PEO) and molecular weight resulted in variable physical and degradation properties for the polyurethanes. Generally, increasing soft segment molecular weight resulted in increasing phase separation and also soft segment crystallinity (PCL-based polyurethanes). The PEO-based polyurethanes exhibited a high degree of hydrophilicity, as noted by water uptake, contact angle and WVP studies, in comparison to the PCL-based polyurethanes. The hydrophilic nature imparted by the PEO soft segment of PEO1000/Phe was hypothesized to promote rapid degradation while the more hydrophobic PCL soft segment of PCL1250/Phe served to reduce the rate of degradation noted.

Cytotoxicity Screening

A cytotoxicity screening assay was developed to assess the potential toxicity of degradation products of the synthesized polyurethanes. Polymers were cast as before and cut into strips which were rinsed in 1,1,1 trichlorotrifluoroethane, to remove silicon-containing surface contamination, and placed in 15 mL polystyrene centrifuge tubes. The tubes containing the polymer were gamma sterilized and filled with 12 mL of keratinocyte growth medium (Gibco KGM+pituitary extract+antibiotic). 3 cm2 polymer surface area per mL solution was used based on previous MTT study done in Dr. Sauder's lab. The tubes containing polymer and KGM were sealed with parafilm and placed in a shaking water bath at 37° C. for up to 42 days. Aliquots of the medium were removed at 7, 14, 28 and 42 days and frozen at −75° C. until assayed. Cultured confluent human foreskin keratinocytes were exposed to the sampled growth medium containing polymer degradation products for 24 h. Cell viability was then determined via investigation of mitochondrial activity by an MTT assay (spectrophotometric analysis of colour change due to metabolism of tetrazolium salt to formazan). The % viable cells was determined with respect to cells exposed to fresh KGM. In addition, the polymer is assayed for mass loss and molecular weight changes.

An initial study using PCL1250/HDI/Phe was undertaken to develop the screening assay. Two separate populations of keratinocytes were used: plate A contained keratinocytes pooled from 7 donors and plate B contained keratinocytes pooled from 4 donors. The results indicate a significant drop in cell viability at the 7 day exposure time and then a return to high levels of viability for the duration of the experiment. This transient change in cell viability is difficult to explain, since each tube was a closed system and a separate tube was assayed for each time point. The phenomenon may result from either: 1) an early initial leaching of low molecular weight toxic materials such as solvent or oligomers which are able to evaporate from the incubation medium; 2) the immediately released compound(s) which cause the loss in cell viability is altered upon continued exposure to the KGM; or 3) the initial toxic response is offset at later incubation times by the generation of a compound which stimulates cell activity.

REFERENCES

1. R. Langer, L. G. Cima, J. A. Tamada and E. Wintermantel, "Future directions in biomaterials," *Biomaterials*, 11, 738–745 (1990).
2. S. W. Shalaby and K. J. L. Burg, "Bioabsorbable polymers update: degradation mechanisms, safety and application," *J. Appl. Biomat.*, 6, 219–221 (1995).
3. M. Sittinger, J. Bujia, N. Rotter, D. Reitzel, W. W. Minuth and G. R. Burmester, "Tissue engineering and autologous transplant formation: practical approaches with resorbable biomaterials and new cell culture techniques," *Biomaterials*, 17(3), 237–242 (1996).
4. A. S. Sawhney and J. A. Hubbell, "Rapidly degraded terpolymers of dl-lactide, glycolide, and -caprolactone with increased hydrophilicity by copolymerization with polyethers," *J. Biomed. Mater. Res.*, 24, 1397–1411 (1990).
5. A. M. Radder, H. Leenders and C. A. van Blitterswijk, "Interface reactions to PEO/PBT copolymers (Polyactive) after implantation in cortical bone," *J. Biomed. Mater. Res.*, 28, 141–151 (1994).
6. S. I. Ertel and J. Kohn, "Evaluation of a series of tyrosine-derived polycarbonates as degradable biomaterials," *J. Biomed. Mater. Res.*, 28, 919–930 (1994).
7. I. Engelberg and J. Kohn, "Physico-mechanical properties of degradable polymers used in medical applications: a comparative study," *Biomaterials*, 12, 292–304 (1991).
8. M. D. Lelah and S. L. Cooper, Polyurethanes in Medicine, CRC Press Inc., Boca Raton, Fla. (1986).
9. B. D. Ratner, K. W. Gladhill and T. A. Horbett, "Analysis of in vitro enzymatic and oxidative degradation of polyurethanes," *J. Biomed. Mater. Res.*, 22, 509–527 (1988).
10. M. Bouvier, A. S. Chawla and I. Hinberg, "In vitro degradation of a poly(ether urethane) by trypsin," *J. Biomed. Mater. Res.*, 25, 773–789 (1991).
11. J. P. Santerre, R. S. Labow and G. A. Adams, "Enzyme-biomaterial interactions: Effect of biosystems on degradation of polyurethanes," *J. Biomed. Mater. Res.*, 27, 97–109 (1993).
12. L. Pinchuk, "A review of the biostability carcogenicity of polyurethanes in medicine and the new generation of 'biostable' polyurethanes," *J. Biomater. Sci. Polymer Edn*, 6(3), 225–267 (1994).
13. K. Sutherland, J. R. Mahoney, A. J. Coury and J. W. Eaton, "Degradation of biomaterials by phagocyte-derived oxidants," *J. Clin. Invest.*, 92, 2360–2367 (1993).
14. B. Eling, S. Gogolewski and A. J. Pennings, "Biodegradable materials of poly(L- lactic acid): Melt-spun and solution-spun fibres," *Polymer*, 23, 1587–1593 (1982).
15. S. Gogolewski and A. J. Pennings, "An artificial skin based on biodegradable mixtures of polylactides and polyurethanes for full-thickness skin wound covering," *Makromol. Chem., Rapid Commun.*, 4, 675–680 (1983).
16. P. Bruin, G. J. Veenstra, A. J. Nijenhuis and A. J. Pennings, "Design and synthesis of biodegradable poly(ester-urethane) elastomer networks composed of nontoxic building blocks," *Makromol. Chem., Rapid Commun.*, 9, 589–594 (1988).
17. D. Cohen, H. Younes and G. Uretzky, "Bioabsorbable polyester-polyether multiblock polymers or polyester-polyether-polyurethane block polymers for surgical articles", *Eur. Pat. Appl.* EP295,055, Dec. 14, 1988.
18. B. I. Dahiyat, E. Hostin, E. M. Posadas and K. W. Leong, "Synthesis and characterization of putrescine-based poly(phosphoester-urethanes)," *J. Biomater. Sci. Polymer Edn*, 4(5), 529–543 (1993).
19. J. C. Powers, T. Tanaka, J. W. Harper, Y. Minematsu, L. Barker, D. Lincoln and K. V. Crumley, "Mammalian chymnotrypsin-like enzymes. Comparative reactivities of rat mast cell proteases, human and dog skin chymases, and human cathepsin G with peptide 4-nitroanilide substrates and with peptide chloromethyl ketone and sulfonyl fluoride inhibitors," *Biochemistry*, 24, 2048–2058 (1985).
20. C. G. Pitt, "Poly- -caprolactone and its copolymers," in *Biodegradable Polymers as Drug Delivery Systems*, R. Langer and M. Chasin, Eds., Marcel Dekker, New York, N.Y., pp. 71–120 (1990).
21. K. E. Bailey and J. V. Koleske, *Polyethylene Oxide*, Academic Press, New York, N.Y. (1976).
22. S. J. Huang, D. A. Bansleben, J. R. Knox, "Biodegradable polymers: chymotrypsin degradation of a low molecular weight poly(ester-urea) containing phenyalanine," *J. Appl. Polymer Sci.*, 23, 429–437 (1979).
23. J. H. Saunders and K. C. Frisch, *Polyurethanes: Chemistry and Technology, Part I*, Interscience Publishers, New York, N.Y. (1967).
24. D. Queen, J. D. S. Gaylor, J. H. Evans, J. M. Courtney and W. H. Reid, "The preclinical evaluation of water vapour transmission rate through burn wound dressings," *Biomaterials*, 8, 367–371 (1987).
25. M. Szycher, V. L. Poirier and D. J. Dempsey, "Development of an aliphatic biomedical-grade polyurethane elastomer," *J. Elastomers Plast.*, 15, 81–95 (1983).
26. A. Z. Okkema and S. L. Cooper, "Effect of carboxylate and/or sulphonate ion incorporation on the physical and blood-contacting properties of a polyetherurethane," *Biomaterials*, 12, 668–676 (1991).
27. G. Woods, *The ICI Polyurethanes Book, Second Edition*, John Wiley and Sons, New York, N.Y. (1990).
28. J. W. C. van Bogart, P. E. Gibson and S. L. Cooper, "Structure-property relationships in polycaprolactone polyurethanes," *J. Polymer Sci., Polymer Phys. Edn,* 21, 65–95 (1983).
29. S. Krause in, *Block and Graft Copolymers*, J. J. Burke and V. Weiss, Eds., Syracuse University, Syracuse N.Y. (1973).
30. G. Spathis, E. Kontou, V. Kefalas, L. Apekis, C. Christodoulides, P.Pissis, M. Ollivon and S. Quinquenet, "Relaxation phenomena and morphology of polyurethane block copolymers," *J. Macromol. Sci.-Phys.*, B29(1), 31–48 (1990).
31. D. M. Wiseman, M. R. Pharm, D. T. Rovee and O. M. Alvarez, "Wound dressings: Design and use," pp. 562–580, in *Wound Healing, Biochemical and Clinical Aspects*, I. K. Cohen, R. F. Diegelmann and W. J. Lindblad, Eds., W. B. Saunders Co., Philadelphia, Pa. (1992).
32. W. H. Eaglstein, "Effect of occlusive dressings on wound healing," *Clin. Dermatol.*, 2, 107 (1984).
33. A Nangia and C. T. Hung, "Preclinical evaluation of skin substitutes," *Burns*, 16(5), 358–367 (1990).
34. S. Wu., *Polymer Interface and Adhesion*, Marcel Dekker Inc., New York, N.Y. (1982).
35. M. D. Lelah, T. G. Grasel, J. A. Pierce and S. L. Cooper, "Ex vivo interactions and surface property relationships of polyetherurethanes," *J. Biomed. Mater. Res.*, 20, 433–468 (1986).
36. J. H. Silver, K. B. Lewis, B. D. Ratner and S. L. Cooper, "Effect of polyol type on the surface structure of sulfonate-containing polyurethanes," *J. Biomed. Mater. Res.*, 27, 735–745 (1993).
37. J.-H. Chen and E. Ruckenstein, "Solvent-stimulated surface rearrangement of polyurethanes," *J. Colloid Interfac. Sci.*, 135(2), 496–507 (1990).
38. A. Gopferich and R. Langer, "The influence of microstructure and monomer properties on the erosion mechanism of a class of polyanhydrides," *J. Polym. Sci.*, 31, 2445–2458 (1993).
39. A. Gopferich, "Mechanisms of polymer degradation and erosion," *Biomaterials*, 17, 103–114 (1996).

EXAMPLE 2

(LDI MATERIAL)

Materials

Polycaprolactone diol (molecular weights 530, 1250 and 2000) and polyethylene oxide (molecular weights 600, 1000) were obtained from Aldrich Chemicals. The soft segment diols were placed in a vacuum oven at 60 C. for at least 48 h to remove residual water prior to reaction. 2,6-diisocyanato methyl caproate (LDI) was obtained from Kyowa Hakko Kogyo Co., Ltd., Tokyo Japan and was distilled under vacuum prior to use. Stannous octoate, used as a catalyst for the prepolymer reaction, was obtained from Sigma. A experimental phenylalanine-based chain extender described previously was synthesized and used in all of the polyurethane reactions. Polyurethane solvents dimethyl formamide (anhydrous grade DMF) and chloroform were obtained from Aldrich and ACP Chemicals Inc., Montreal PQ respectively.

Polymer Synthesis and Film Casting

Polyurethanes were synthesized via the standard, two-step reaction procedure. Briefly, LDI was reacted with either polyethylene oxide (PEO) or polycaprolactone diol (PCL) at a 2:1 molar ratio in anhydrous DMF at 85° C. The prepolymer reaction was catalyzed using 0.1% stannous octoate and allowed to proceed for 150 minutes. The reaction temperature was lowered to 25° C., the chain extender was added at a 1:1 molar ratio with the prepolymer and allowed to react for approximately 18 h. The polymer was precipitated in saturated aqueous KCl and vacuum filtered. The polymer was then immersed in distilled water for 48 h, refiltered and dried under vacuum at 60° C. for 48 h, stored in a desiccator until use.

All solid films were prepared by solution casting. The polyurethanes were dissolved in chloroform at a concentration of 3–5% w/v. The polymer films cast for the water uptake and DSC studies were obtained by pouring the polymer solution (20 mL) into level 5 cm PTFE casting dishes and cast at room temperature. Polyurethane films cast for tensile testing were obtained by pouring the polymer solution (200 mL) into a leveled 20×25 cm PTFE casting dish. The dishes were covered to prevent dust from contaminating the film and excessively fast casting, which can result in surface defects. The cast films were removed from the casting dishes and dried under vacuum at 60° C. for 48 h to remove residual solvent.

The polymer nomenclature used here is based on the type and molecular weight of the soft segment and the chain extender. For example, PCL1250/Phe refers to a polyurethane consisting of 1250 molecular weight PCL, chain extended with the novel phenylalanine-based chain extender. All of the polyurethanes employ LDI as the diisocyanate component.

Polyurethane Characterization

Gel permeation chromatography (GPC) was employed to determine polyurethane molecular weights. The polymers were dissolved at 0.25% w/v in the GPC carrier solvent (0.1 M LiBr in DMF) and 200 µL samples were injected. The number and weight average molecular weights were determined from the retention time data with Waters Baseline™ software (Waters Chromatography, Mississauga ON) using a calibration curve generated with polystyrene standards (Varian, Sunnyvale Calif.).

Differential scanning calorimetry (DSC) was performed using a Thermal Analyst 2100 thermal analyzer at the Institute for Materials Research (McMaster University, Hamilton ON) to determine the phase segregated morphology of the polyurethanes. Scan rates of 15° C. per minute were employed over a temperature range of −100 to 250° C.

The bulk hydrophilicity of the polyurethanes was quantified by determining the amount of water that each polymer absorbed at 37 C. Films 100 μm thick were cast as described above and four 1×1 cm pieces of each polymer were cut out and weighed. The samples were then placed in 20 mL glass scintillation vials and 20 mL of distilled water were added. After 48 h, the samples were removed, weighed and then dried under vacuum and reweighed. The increase in weight due to water absorption was calculated as the difference between the hydrated and subsequently dried samples since some of the polymers exhibited significant weight loss over the 2 day experiment.

Water contact angles were measured on polymer coated 18×18 mm glass microscope cover slides. The cover slides were coated by 3 sequential dips in a solution of polymer in chloroform (5% w/v) and dried at 55° C. for 24 h. The samples were washed with a 0.1% detergent solution (Alconox, New York N.Y.), rinsed with distilled water and dried at 55° C. for 2 h. The samples were subsequently washed with 1,1,2-trichlorotrifluoroethane (Aldrich) to remove silicon-containing surface contaminants and dried under vacuum at 60° C. overnight. The advancing and receding water contact angles were measured by goniometer using the sessile drop technique. Ten measurements of both advancing and receding angles were made.

X-ray photoelectron spectroscopy (XPS) was performed at the Surface Science Laboratory at the University of Toronto. Take-off angles of 90, 30 and 20° were employed to obtain a compositional depth profile of the polymer surfaces. Polymer coated cover slides were prepared as described for the contact angle studies. Low resolution spectra were performed to generate elemental composition data while high resolution analysis of the carbon 1s peak was performed to determine the relative contributions of the urethane, urea, ester and ether groups.

In vitro degradation experiments were carried out to determine the rate of degradation of the polyurethanes in buffer and enzyme solutions. PCL1250/Phe, PCL2000/Phe and PCL1250/CDM were cast into films approximately 200 μm thick and 1 cm diameter round pieces were punched out. The pieces were placed in a vial containing 10 ml of either buffer (0.036 M Tris with 0.045 M CaCl2 and 0.01% NaN3) or buffer containing 500 U/mL α-chymotrypsin (bovine pancreatic, type II, Sigma). The vials were placed in a shaking water bath at 37 (C. The solutions were changed every 2 days to account for the reduction in enzyme activity over time. The polymer samples were removed at 1, 2 and 3 weeks, dried and prepared for SEM analysis.

RESULTS AND DISCUSSION

Polyurethane molecular weights as measured by GPC are shown in Table 8. The PCL containing polymers generally exhibit higher molecular weights than the PEO containing polyurethanes. This difference is believed to result from the presence of water in the highly hydrophilic PEO soft segment prior to and during polymerization. Water will competitively react with the diisocyanate in an undesirable urea-forming side reaction, thus limiting ultimate polymer molecular weight. As may be expected, the higher molecular weight PCL containing polyurethanes are substantially stronger than the PEO containing polyurethanes. In fact the PEO containing polyurethanes are tacky, semiviscous materials which deform easily and are very difficult to handle.

Differential scanning calorimetry results are given in Table II. As was noted in Example 1 for similar polyurethanes containing HDI, the soft segment glass transition temperature deceases with increasing soft segment molecular weight indicating increasing phase separation. However, the LDI containing polyurethanes appear to exhibit a greater degree of phase mixing as the soft segment molecular weight is decreased since the PCL530/Phe and PEO600/Phe glass transition temperatures are significantly higher than was noted for the corresponding HDI containing polymers. This increased phase mixing at low soft segment molecular weight may result from hard segment disruption caused by LDI. LDI is less symmetric than HDI and also contains a methyl ester side chain, both of which may inhibit efficient chain packing in the hard segment. An absence of any distinguishable hard segment transitions in the LDI polyurethanes also supports the notion of reduced hard segment cohesion. The PCL1250 and PCL2000 containing polyurethanes also exhibit soft segment crystallization with the crystal melt temperature increasing with PCL molecular weight again suggesting increased phase separation with PCL molecular weight.

Figure 16:
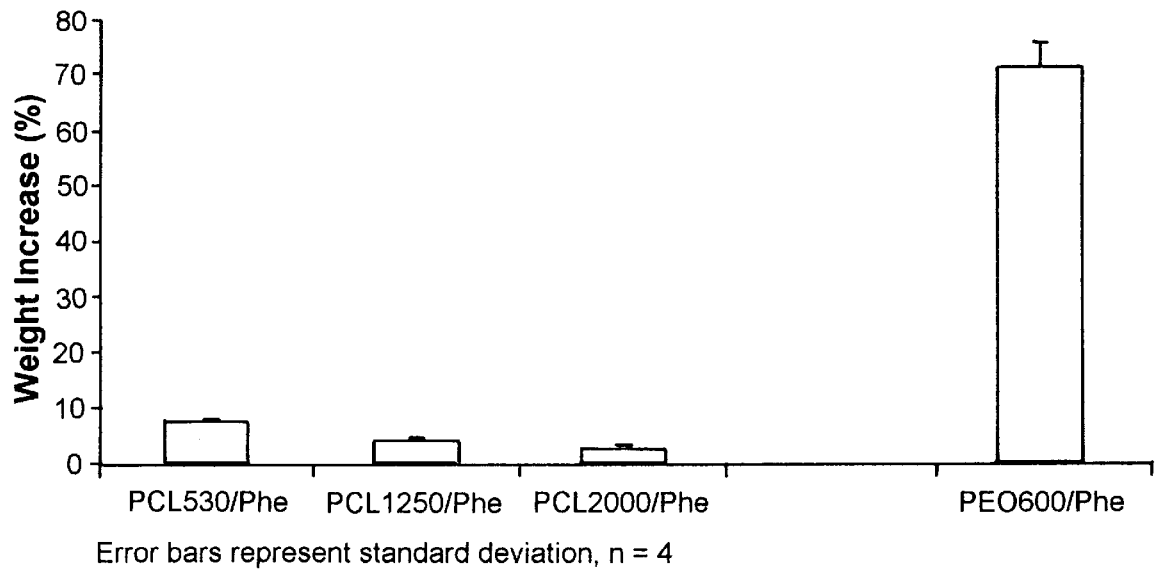
FIG. 16 is a plot of water uptake for several biodegradable polyurethanes.

The water uptake data observed for the polyurethanes is given in FIG. 16. The PCL polyurethanes exhibit substantially lower values of water uptake than the PEO polyurethanes. In fact, the PEO1000/Phe polyurethane disintegrated into a fine powder upon exposure to water and thus the water uptake could not be measured. The PEO600/Phe polyurethane deformed significantly upon exposure to water but could still be handled and weighed for water uptake. The PCL polyurethanes generally exhibited low values of water uptake, as expected due to the relatively hydrophobic nature of PCL. Increasing PCL molecular weight appears to lead to decreasing water uptake which is presumably a result of increasing hydrophobic soft segment content, but may also be affected by differences in soft segment crystallinity since it also increases with PCL molecular weight.

Figure 17:
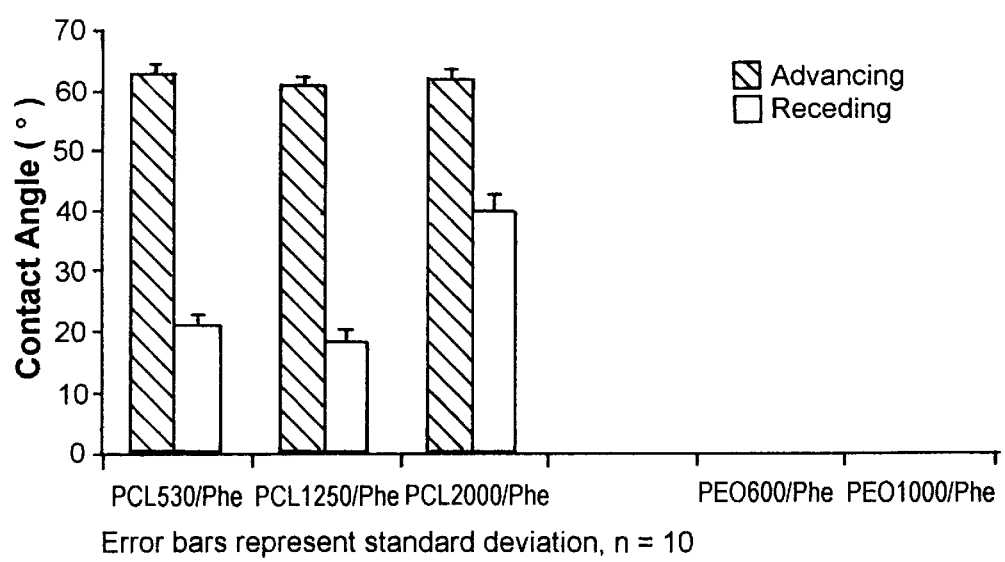
FIG. 17 is a plot of contact angle data for several biodegradable polyurethanes.
Figure 18:
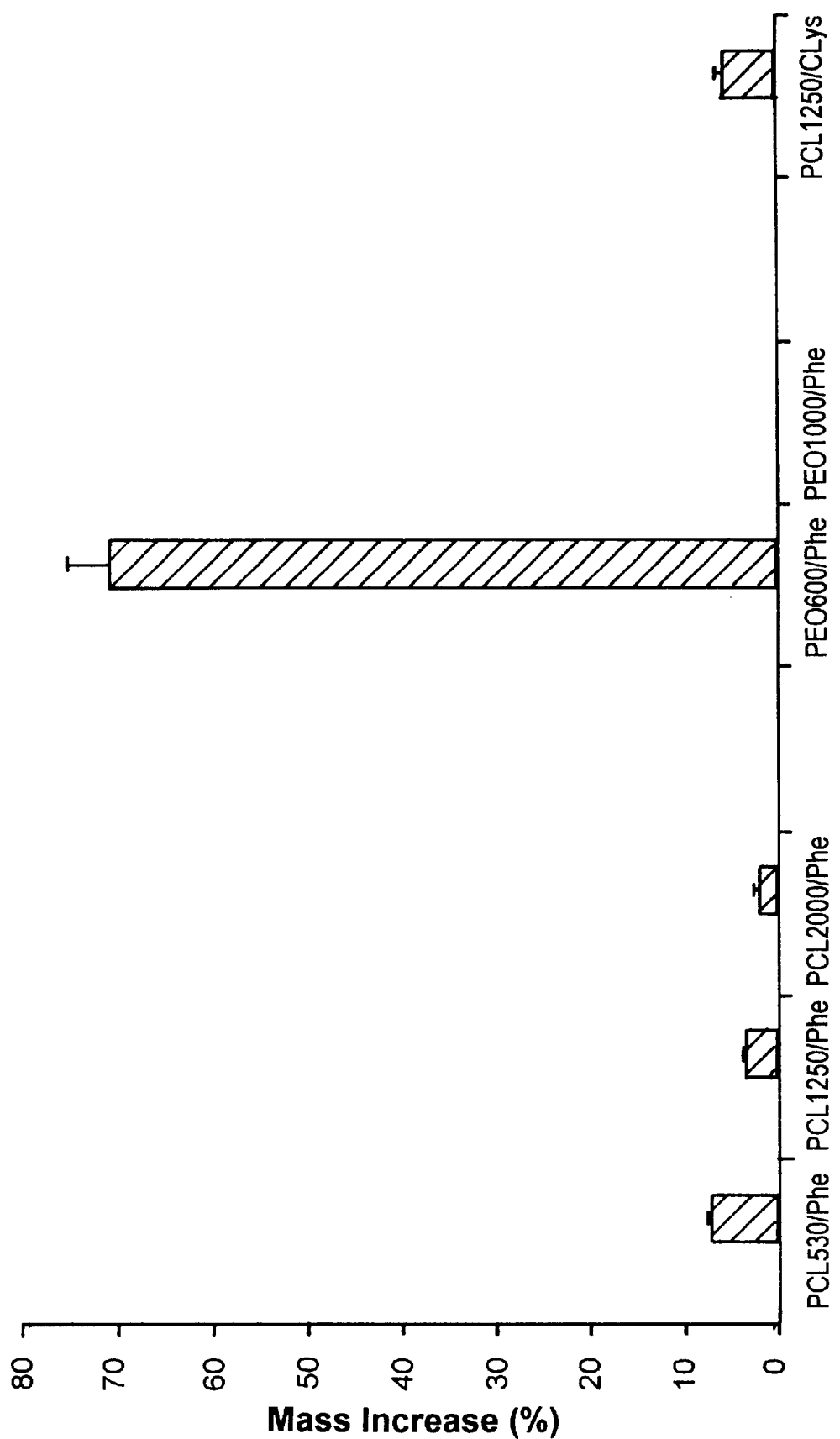
FIG. 18 is a plot of water uptake for several biodegradable polyurethanes.
Figure 19:
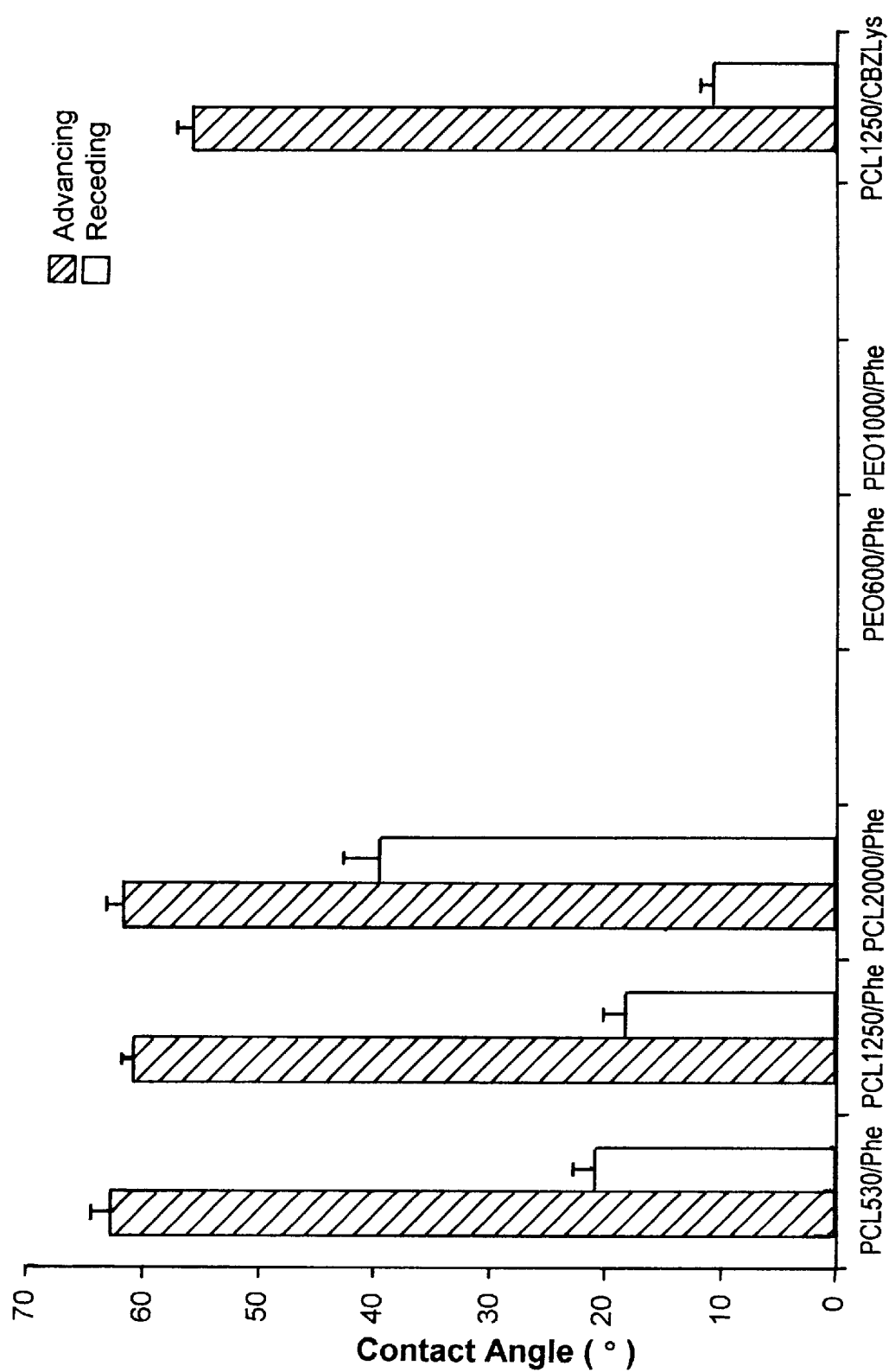
FIG. 19 is a plot of contact angle data for several biodegradable polyurethanes.
Figure 20:
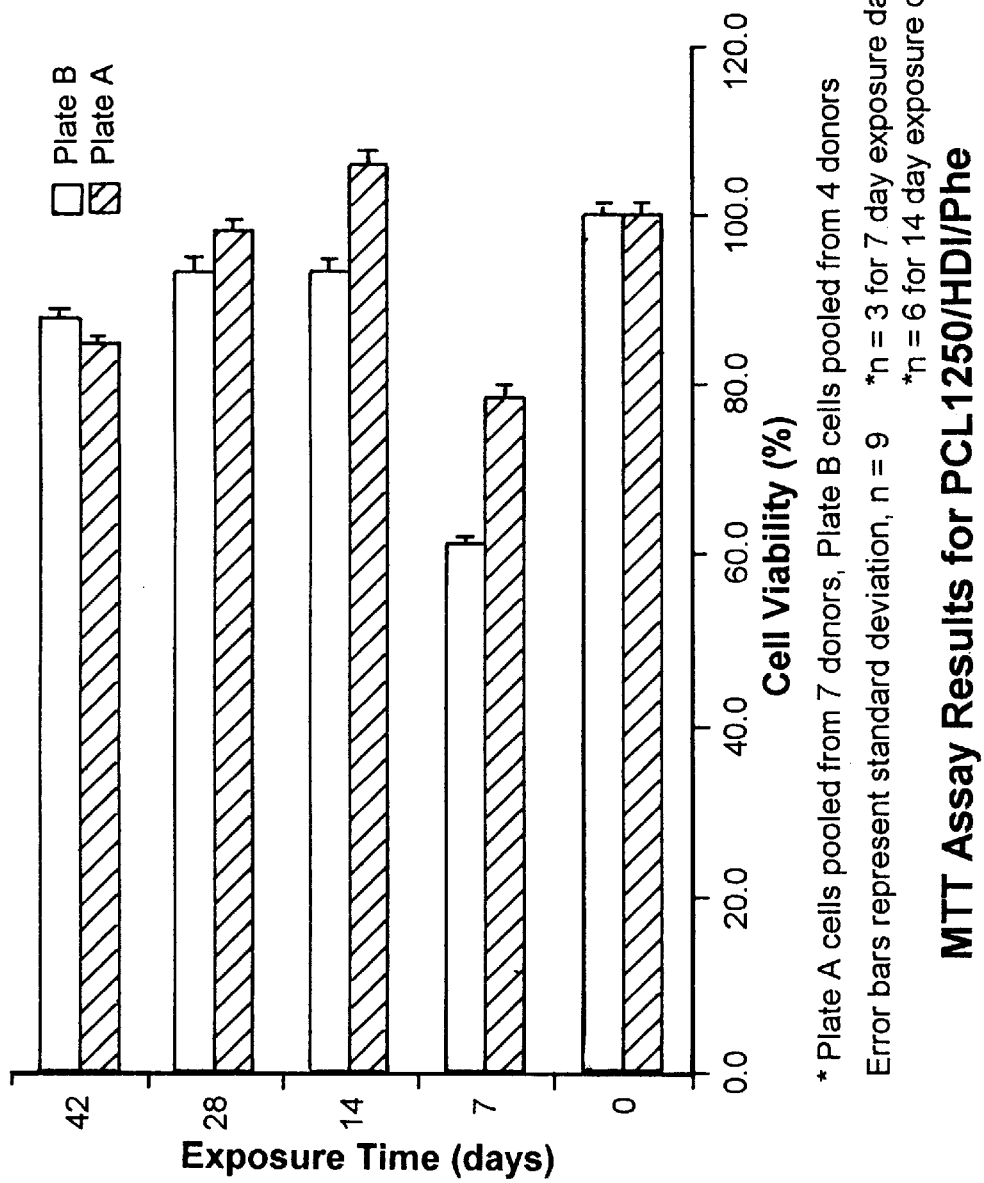
FIG. 20 is a plot of MTT Assay results for a biodegradable polyurethane.
Figure 21:
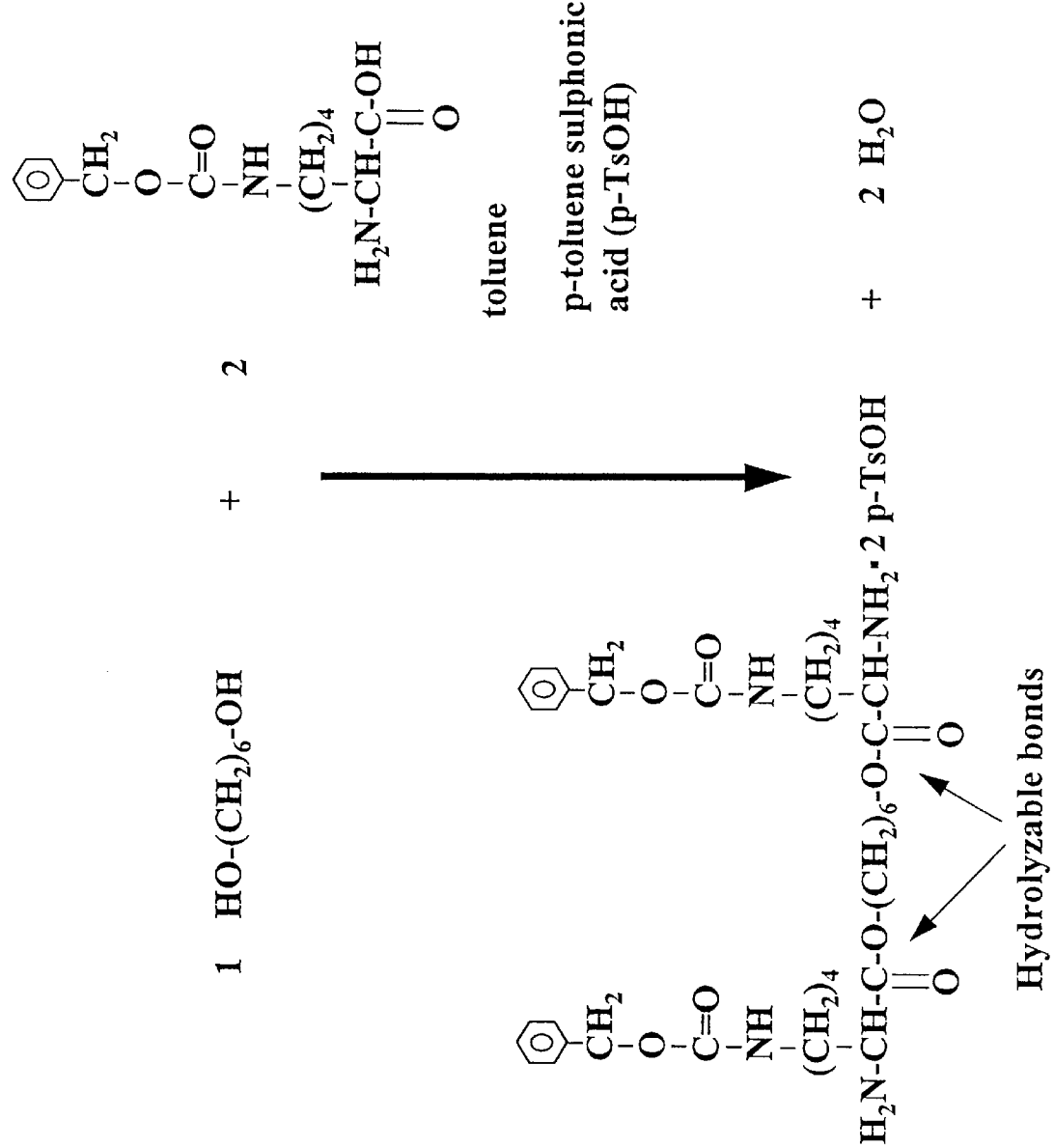
FIG. 21 is a reaction scheme for another chain extender for use in forming biodegradable polyurethanes.
Figure 22:
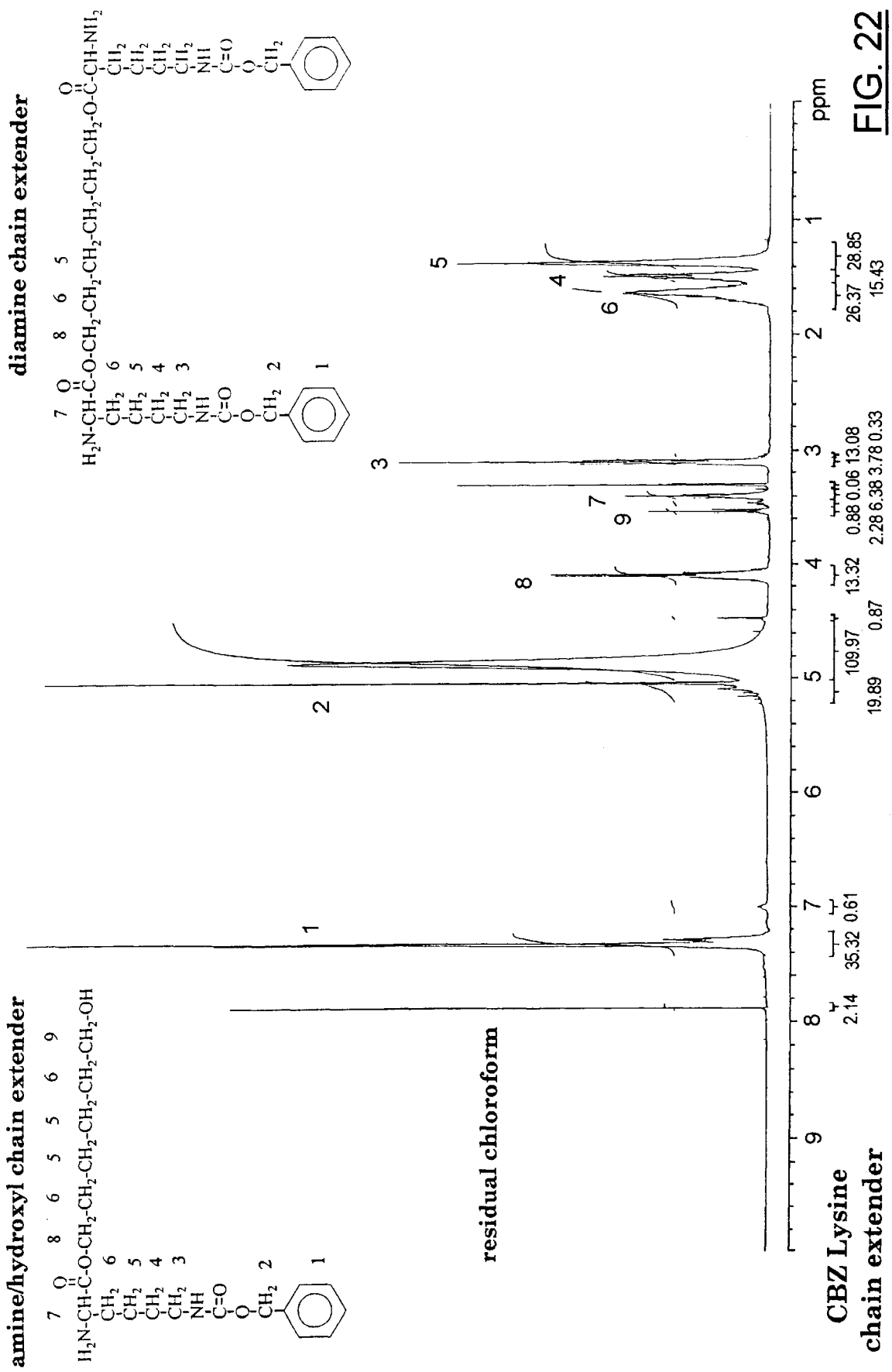
FIG. 22 is an H-NMR spectrum of the chain extender of FIG. 21.
Figure 24:
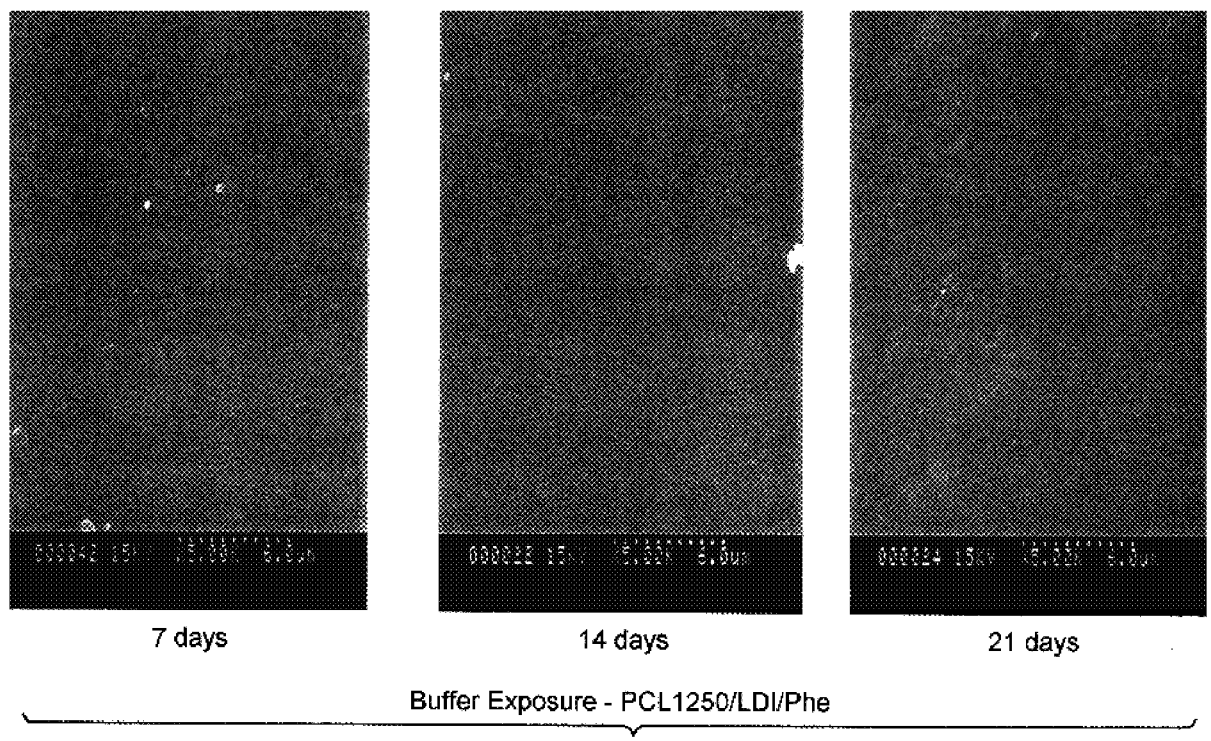
Figure 25:
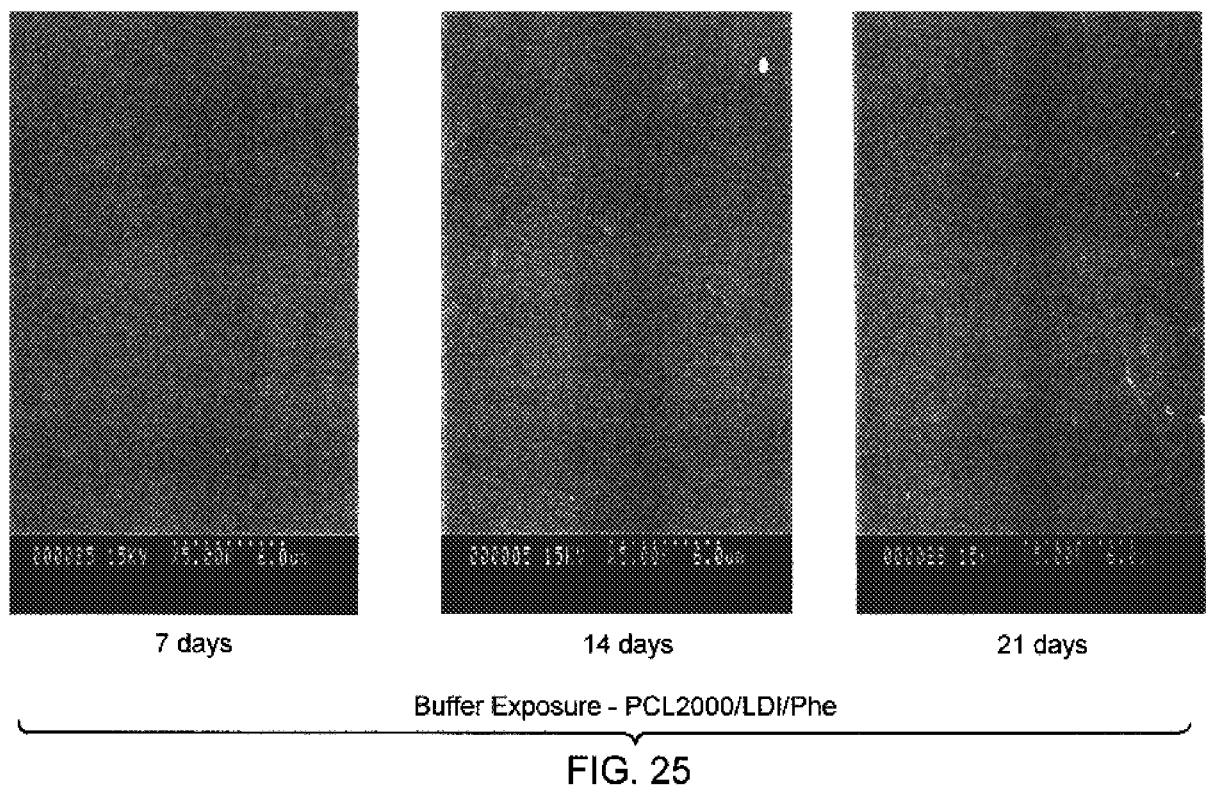
Figure 26:
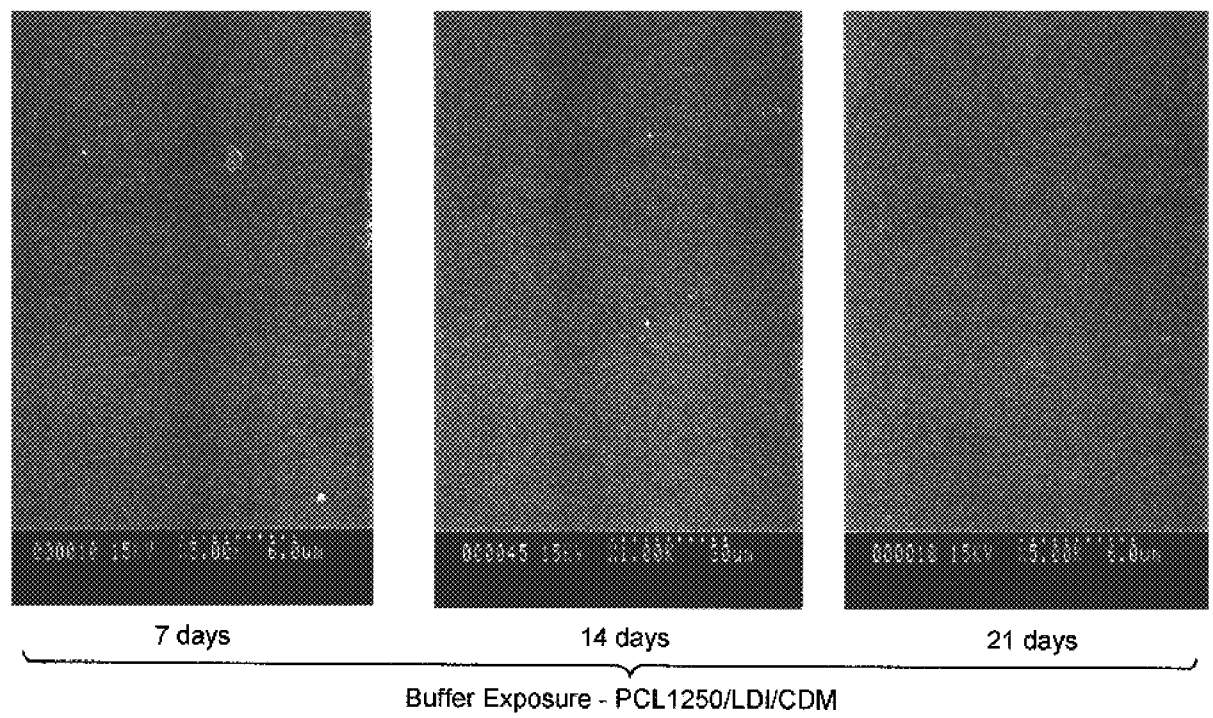
Figure 27:
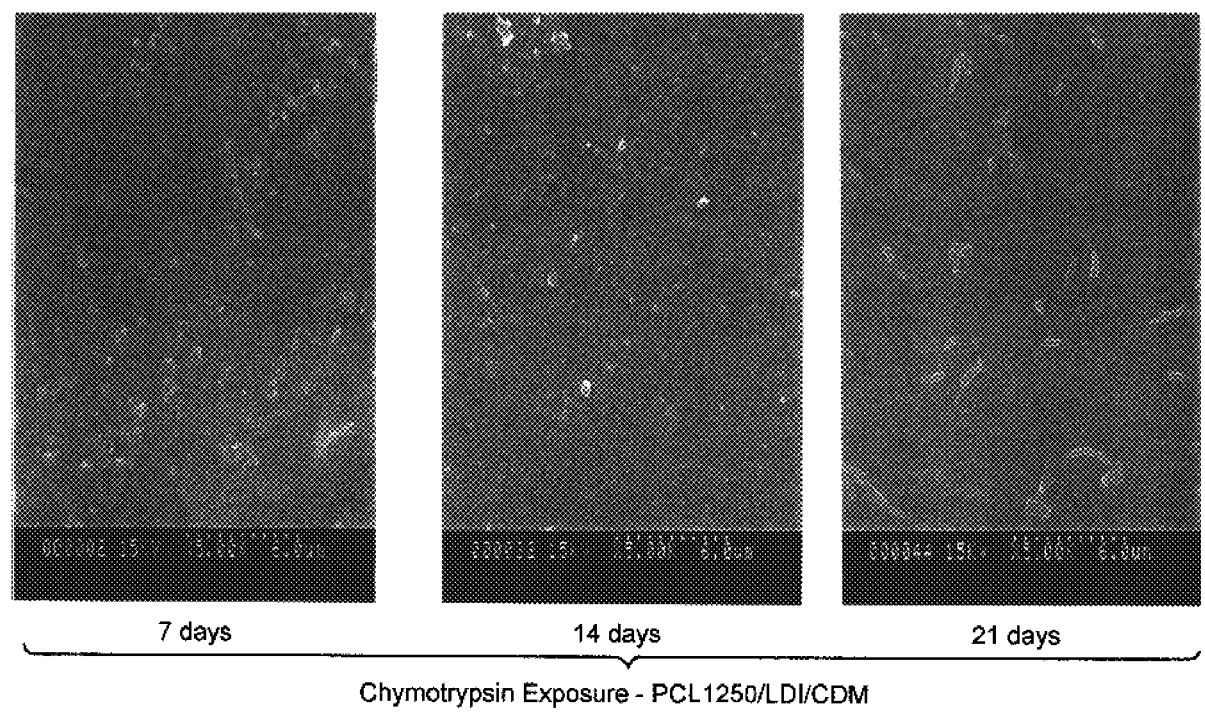
Figure 28:
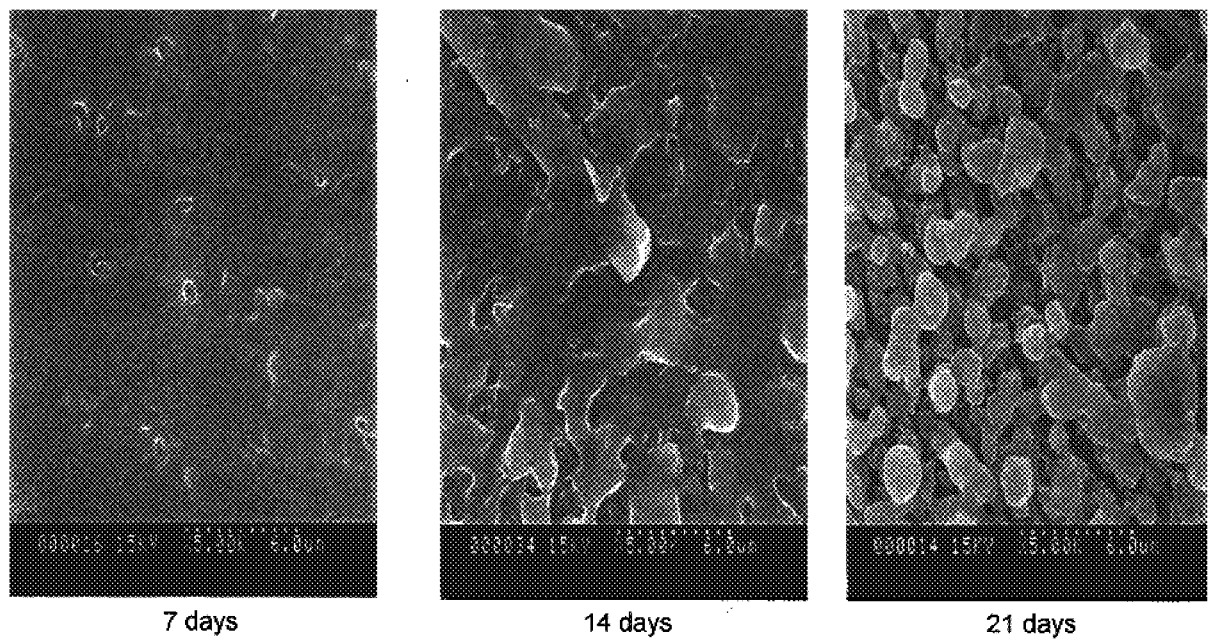
Figure 29:
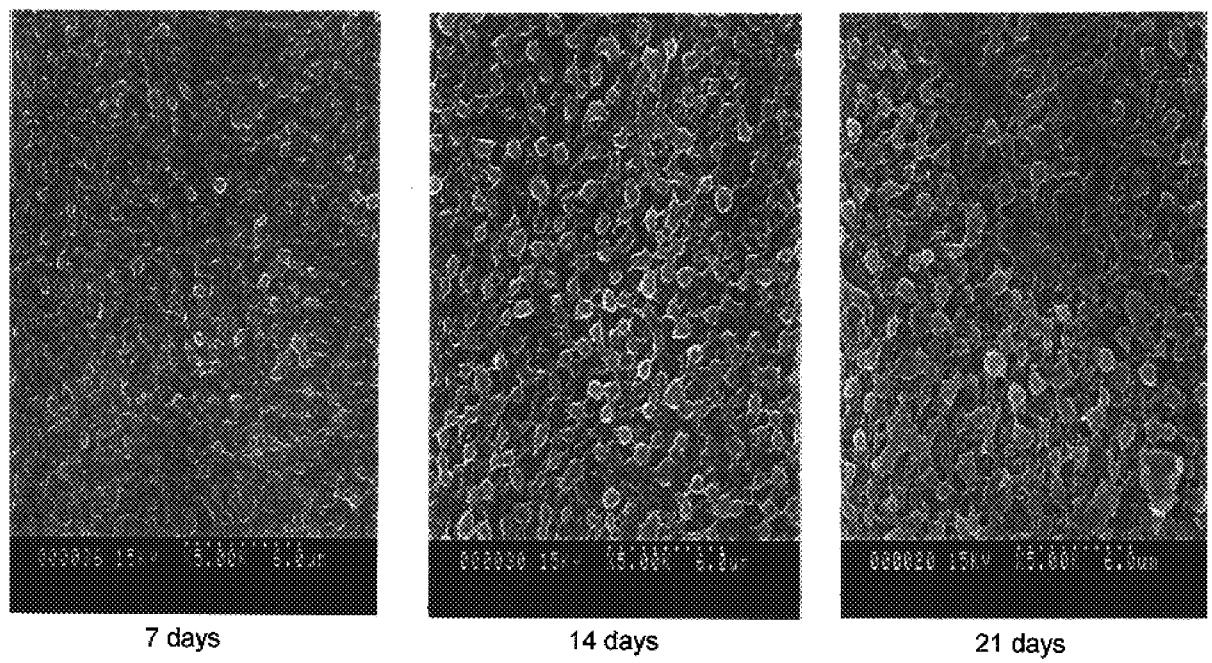
Figure 30:
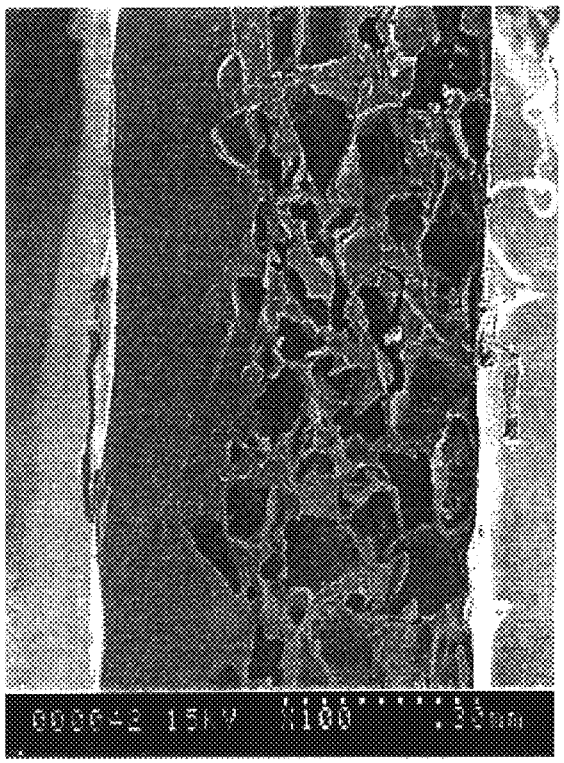
FIGS. 30 to 33 are SEM's of still other biodegradable polyurethane samples.
Figure 31:
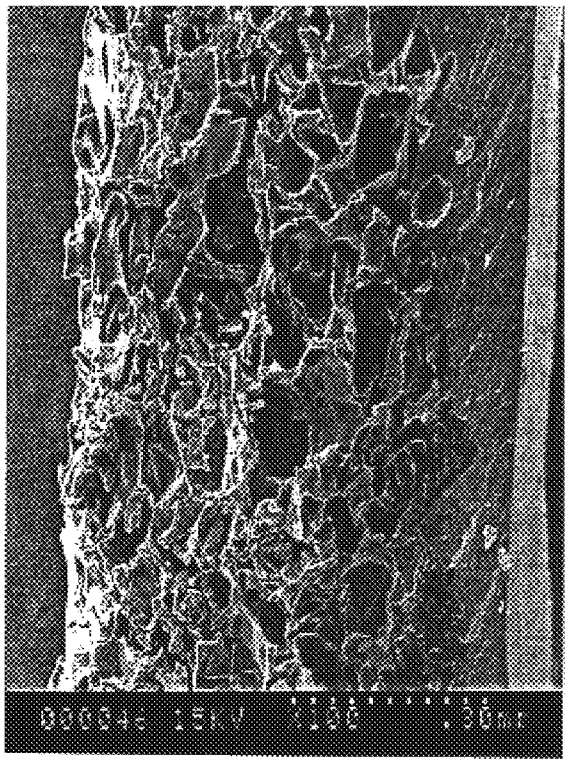
Figure 32:
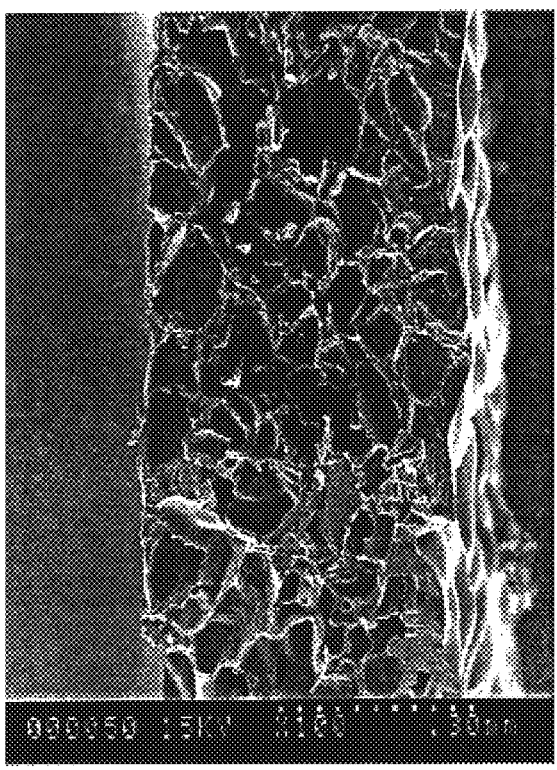
Figure 33:
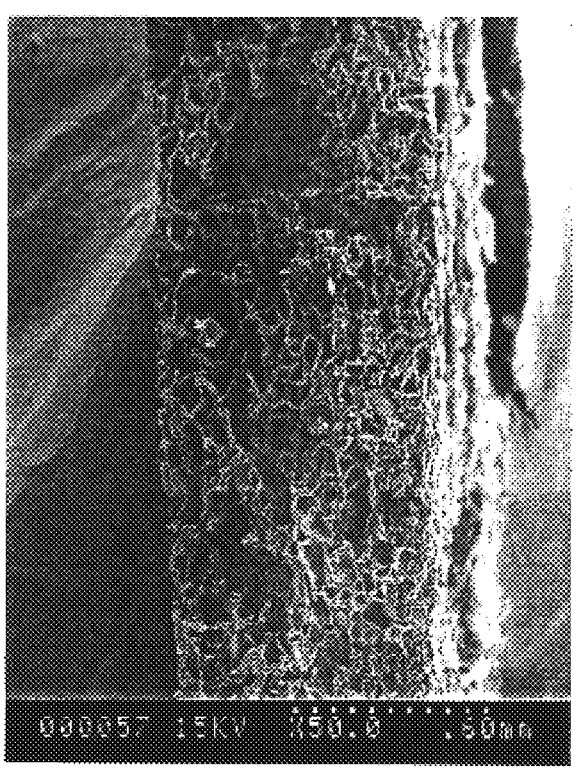

Contact angle data is given in FIG. 17. The PCL containing polyurethanes exhibit similar advancing contact angles (60 to 65) suggesting similar surface hydrophilicity. Contact angles for the PEO polyurethanes could not be measured since these films spontaneously deformed at the contact line thereby making any readings impossible. The deformation of the PEO polyurethane films at the contact line presumably results from the fact that the polymer is physically unable to resist the contractile force resulting from the surface tension of the liquid.

The PCL polyurethanes all exhibit significant hysteresis which may result from several factors including surface reorientation upon exposure to the water. The receding contact angles observed for the PCL530/Phe and PCL1250/Phe polymers is similar (approximately 20) indicating a similar degree of surface reorientation upon exposure to the water drop to favor the more polar hard segment regions. However, the PCL2000/Phe polyurethane displays a significantly higher receding contact angle, possibly indicating limited surface rearrangement in response to the water drop. The reduced surface rearrangement in the PCL2000/Phe polymer may result from the increased crystallinity noted for this polymer by DSC as well as a decrease in the hard segment content. Crystallinity can be expected to restrict molecular motion and thus potential for surface rearrangment in comparison to a purely amorphous phase. This would then be expected to result in an increased receding contact angle. PCL1250/Phe also exhibits soft segment crystallinity, however this polymer exhibits similar advancing and receding contact angles to the completely amorphous PCL530/Phe. While the origin of this behavior is unclear, it may result from differences in phase separation. Increased phase separation in PCL1250/Phe may allow for greater alteration in surface chemistry upon water exposure than for the more phase mixed PCL530/Phe. Therefore, a combination of the effects of crystallinity and phase separation may account for the similarity in contact angles noted.

Elemental surface analysis provided by XPS is given in Table 9. The take-off angle was varied (90, 30 and 20 relative to the surface) to obtain a compositional depth profile. Since nitrogen is present in the hard segment only, nitrogen content can be used to indicate the relative amount of hard and soft segment in the surface region. Table 9 shows decreasing nitrogen content with decreasing depth of analysis indicating soft segment surface enrichment which is commonly observed. In addition, decreasing soft segment content leads to increasing nitrogen content indicating increasing hard segment content as expected. The nitrogen content of the PEO polyurethanes generally display less depth dependence indicating greater phase mixing as was noted by DSC.

The high resolution carbon 1s data shows a trend of decreasing contribution of the urea/ester/urethane component with decreasing depth of analysis. This data provides additional evidence for the depletion of hard segment domains at the polymer surface, at least in the vacuum environment of XPS. It is important to note that the hard segment surface depletion noted by XPS may not be indicative of the surface composition which prevails in an aqueous biological environment. Since the hard segment contains hydrolyzable ester bonds, the speed of degradation will likely be impacted by the amount of theses groups at the surface, particularly for surface mediated enzymatic degradation.

The in vitro degradation of the PCL polyurethanes in a chymotrypsin solution and buffer was monitored over a 3 week period at 37 C. In addition, a control polyurethane consisting of PCL1250, LDI and chain extended with cyclohexane dimethanol (PCL1250/CDM) was included to determine if the inclusion of phenylalanine in the polymer backbone affected the rate of enzymatic degradation. Chymotrypsin was chosen as the enzyme for the degradation study because its active site recognizes and cleaves proteins at phenylalanine residues and a variety of chymotrypsin-like enzymes may be present at the site of implantation or use. Alteration in the surface morphology of the polymers was monitored by scanning electron microscopy (SEM) and is shown in FIGS. 24–29. The polyurethanes exposed to buffer were unaffected (FIGS. 24–26) indicating little, if any, degradation occurred. The PCL1250/CDM polymer (FIG. 27) showed minor surface alterations upon exposure to the chymotrypsin solution, indicating little enzyme-mediated degradation. In contrast, the two phenylalanine-based chain extended polymers showed marked and progressive surface alterations. The polymers appear to develop a porous surface morphology presumably resulting from the specific enzyme-mediated degradation of these polymers. Thus, it appears the inclusion of phenylalanine in the polyurethane backbone confers specific susceptibility towards cleavage by chymotrypsin, and these polymers would likely degrade much more quickly in vivo than in simple buffer degradation experiments.

EXAMPLE 3

CBZ Lysine Chain Extender—Synthesis, Characterization & Use in Polymerization

Synthesis

The CBZ Lysine-based chain extender was synthesized by the reaction of 2 moles of CBZ Lysine (Sigma Chemicals) with 1 mole of 1,6 hexane diol. The diol has been commonly used in the synthesis of degradable polymers (polyorthoesters) and thus was presumed to be relatively non-toxic.

The reaction was carried out in the same manner as the phenylalanine-based chain extender but was allowed to proceed for 72 to 96 hours rather than 2 hours. This increased reaction time was necessary to maximize the conversion as high as possible. The raw material synthesized was dried in a vacuum oven at 80° C. for 24 h to remove any residual toluene. The dried material was then dissolved in distilled water at approximately 10% wt/vol and reacted with a twofold excess of potassium carbonate to convert the amine salt to the free amine used for polymerization. The free amine was then filtered out, dried in a vacuum oven at room temperature for 48 h, and dissolved in chloroform (10% wt/vol). The dissolved chain extender was filtered to remove any insoluble impurities and the chloroform was evaporated off leaving the purified chain extender in the free amine form.

Characterization

The CBZ Lysine chain extender thus synthesized has been characterized by NMR spectroscopy and elemental analysis. Both modes of analysis indicate that the chain extender prepared as above does not completely form a diamine as anticipated. Rather a portion of the material synthesized was present as an amine/hydroxyl which forms due to the reaction of 1 mole of CBZ Lysine and 1 mole of 1,6 hexane diol instead of 2:1. The synthesis method employed above gives a mixture of the two compounds in the ratio of 70% diamine and 30% amine/hydroxyl. However, both the diamine and amine/hydroxyl can serve as chain extenders in the polymerization reactions, since both amines and hydroxyls are reactive toward isocyanate groups. The relative amounts of diamine and amine/hydroxyl can be evaluated via NMR by comparing the integrated areas of the peaks labelled 8 and 9. Peak 8 results from the protons adjacent to the ester bond formed during the reaction and thus is indicative of successful reaction forming a diamine. The peak at 9 results from the protons adjacent to the hydroxyl group of the 1,6 hexane diol and thus is indicative of the unreacted end group of the hexane diol forming an amine/hydroxyl. Comparing the integrated areas between peaks 8 and 9 while knowing how many protons are contributed by each molecule allows one to determine the relative amounts of each compound. Once this was known, it was possible to calculate what the correct stoichiometric amount needed for the polymerization reaction.

Polymerization

The CBZ Lysine chain extender was employed in the polymerization reaction in exactly the same manner as the phenylalanine chain extender. The resulting polyurethane was precipitated and dried as before as well. Presently, a PCL1250/LDI/Clys and PCL2000/LDI/Clys have been synthesized and characterized. The PCL1250 polymer was of modest molecular weight 16,000 apparently containing a significant low molecular weight fraction. The PCL2000 polymer contains two distinct molecular weight distributions and thus and average molecular weight cannot be defined. The apparent duality of the molecular weight distributions of the CBZ lysine chain extended polymers likely results from the mixture of molecules used as the chain extender (diamine and amine/hydroxyl).

Differential scanning calorimetry on these two polymers showed the typical decreasing soft segment glass transition temperature with increasing soft segment molecular weight. This trend indicates increasing phase separation with increasing soft segment molecular weight as for the phenylalanine chain extended polymers. Also, similar to the Phe polymers, the PCL1250 and PCL2000 polyurethanes exhibited soft segment crystallization with increasing melt temperature as the PCL molecular weight increased.

While the PCL1250 polyurethane was a soft elastomeric material, the PCL2000 polyurethane was found to be a hard brittle material which fractured easily upon handling.

The PCL1250 polymer was characterized by XPS, contact angle and water uptake experiments. The water uptake for this polymer was similar to that for PCL1250/LDI/Phe. The advancing and receding contact angles were also moderately lower than for PCL1250/Phe indicating greater surface hydrophilicity and a similar degree of surface reorientation upon exposure to water. The XPS data indicates that PCL1250/Clys contains significantly more nitrogen at the surface than PCL1250/Phe as expected, since the lysine-based chain extender contains 1 or two additional nitrogen atoms in comparison to the phenylalanine one. Again, the nitrogen and urea/ester/urethane component of the carbon is peak decrease with decreasing depth of analysis indicating soft segment surface enrichment.

Generally, it appears that the CBZ lysine chain extended polyurethanes displays the same general characteristics as the phenylalanine chain extended polyurethanes except that the former polymers were obtained at a significantly lower molecular weight and thus their mechanical strength was substantially reduced.

Deprotection

The polymers synthesized using the CBZ lysine-based chain extender will subsequently be deprotected. This means that the CBZ group (carbobenzoxy) which is initially attached to the $\xi$-amine of lysine will be cleaved off via a hydrogenolysis reaction to regenerate to native lysine. A protected form of lysine was employed because if the side chain amine ($\xi$) was not protected it would be available for uncontrolled and random cross-linking reactions. The hydrogenolysis reaction involves dissolving the polymer in dimethylformamide (DMF) and bubbling H2 gas through the solution in the presence of a palladium catalyst. This reaction is commonly used in peptide synthesis procedures.

EXAMPLE 4

Foam Casting of Polyurethanes

A study of polyurethane foam formation using a salt (NaCl) casting technique was undertaken using a PCL2000/HDI/Phe. The effect of varying the salt to polymer mass ratio was investigated by SEM and water uptake and water vapour permeance measurements.

The polyurethane was dissolved in chloroform at 3% (wt/vol) and filtered to remove any insoluble impurities. Sodium chloride which had been previously sieved to the size range of 53 to 150 (m was weighed and added to the polymer solution so that the percentage of salt in the total salt+polymer final composite varied from 60, 70, 80 and 90% mass percent salt. It was believed that increasing the relative salt content of the composite film would lead to increasing porosity. The composite salt+polymer film was then immersed in distilled, deionized water for 3 days, removing the water and adding fresh water twice a day. After the immersion process was completed, the sodium chloride had been completely removed leaving a porous polymer film with pore sizes similar to the sieved salt size.

Scanning electron microscopic evaluation, as shown in FIGS. 30 to 33, of the cast films showed that as the salt content was increased from 60 to 90%, the films changed from a bilaminar porous/nonporous structure to a completely porous structure. The bilaminar structure is believed to result from the fact that the polymer is insufficiently viscous to retain the salt particles in solution during casting. Thus the salt sinks to the bottom of the casting solution and if more polymer than what is required to fill the interstices of the salt layer is present, then the remainder of the polymer will form a nonporous skin layer of varying thickness depending on the amount of "excess" polymer. This is an interesting result, since bilayer materials may be particularly useful as tissue engineering scaffolds for skin and other bilayer tissues.

Figure 34:
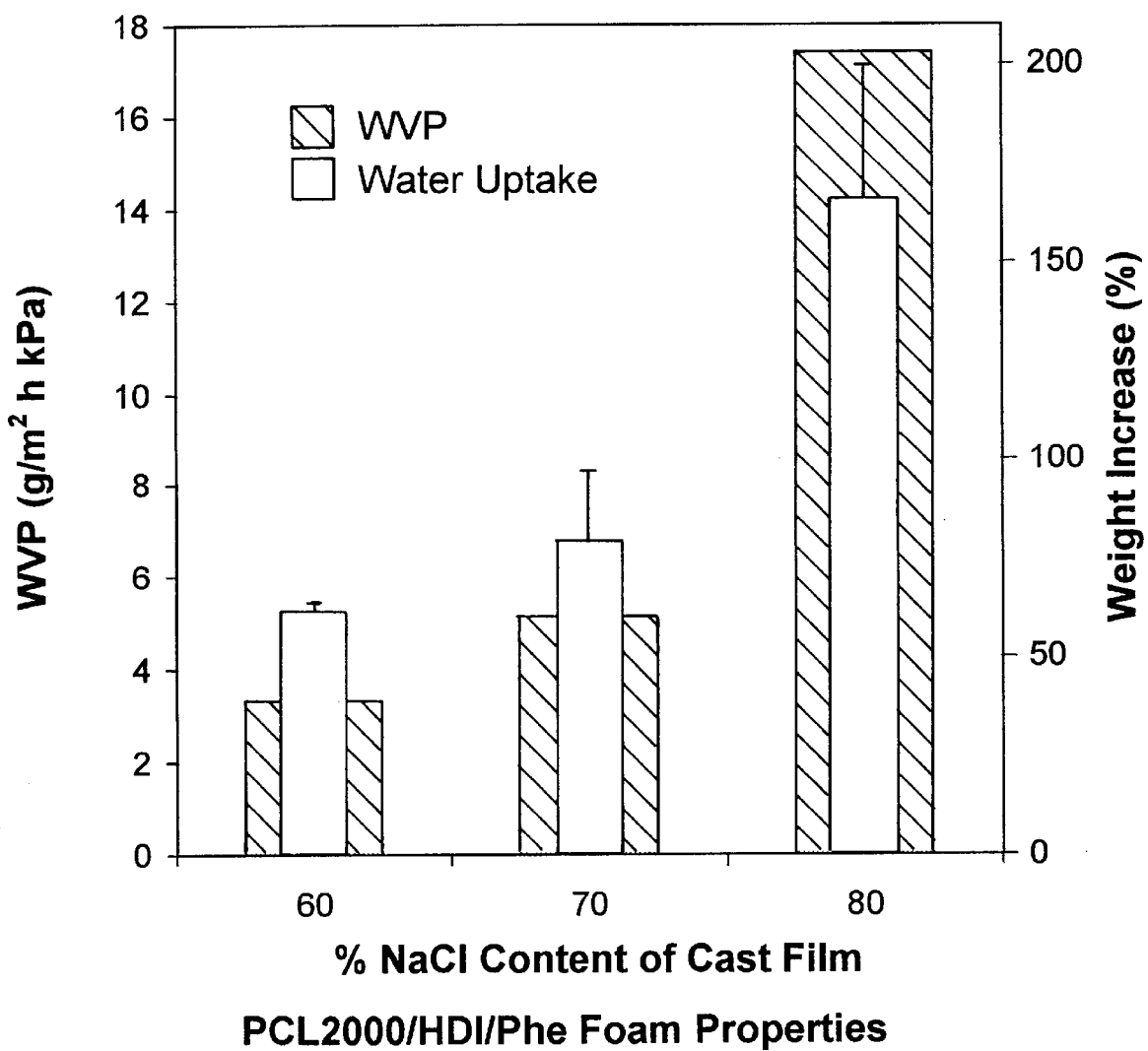
FIG. 34 is a plot water uptake and water vapour permeance versus salt content for selected polyurethane samples.

Referring to FIG. 34, subsequent studies showed increasing water uptake and rate of water vapour permeance as the NaCl content used during casting was increased. It was observed that the water uptake could be increased approximately threefold by increasing the percentage of salt used during casting from 60 to 80% and this behavior is believed to result from reduction in the nonporous skin layer causing increased overall porosity. In addition, the rate of water vapour permeance through the films increased dramatically between 70 and 80% salt content. This dramatic increase is likely due to the alteration in the film structure from a bilayer structure containing a continuous nonporous layer at 70% salt to a bilayer structure containing a noncontinuous nonporous layer at 80%. Thus the thickness and the structure of the nonporous skin layer may be altered to produce, for example, a wound dressing or artificial skin material which has variable properties in terms of both ability to absorb wound fluid and transport water vapour from the wound site. This is important, since wound conditions may vary from patient to patient and between different types of wounds.

In summary the salt casting technique investigated was straightforward and useful in preparing polyurethane films of defined pore size and variable structure (bilayer, unilayer).

TABLE 1

Standard L-amino acids

| | |
|---|---|
| glycine | asparagine |
| alanine | glutamine |
| valine | tryptophan |
| leucine | cysteine |
| isoleucine | methionine |
| phenylalanine | aspartic acid |
| proline | glutamic acid |
| serine | lysine |
| threonine | arginine |
| tyrosine | histidine |

TABLE 2

Soft segment polyols polyethylene oxide (PEO)
polypropylene oxide (PPO)
polytetramethylene oxide (PTMO)
polyethylene adipate
polytetramethylene adipate
polycaprolactone diol

TABLE 3

Atomic Weight Percents of Chain Extender by Elemental Analysis

| | Tosylate Salt | | Free Diamine | |
| --- | --- | --- | --- | --- |
| Atom | Theory (wt %) | Measured (wt %) | Theory (wt %) | Measured (wt %) |
| C | 61.36 | 60.85 | 71.21 | 68.00 |
| H | 6.44 | 6.45 | 7.81 | 7.78 |
| N | 3.58 | 3.58 | 6.39 | 6.06 |
| S | 8.19 | 8.64 | 0.00 | 0.18 |

TABLE 4

Polyurethane Molecular Weight Data from GPC

| Polymer | Number Avg. Molecular Weight |
| --- | --- |
| PCL530/Phe | 98,820 |
| PCL1250/Phe | 138,980 |
| PCL2000/Phe | 102,320 |
| PEO600/Phe | 79,020 |
| PEO1000/Phe | 24,960 |

TABLE 5

Thermal Transition Temperatures from DSC

| | Soft Segment | | Hard Segment |
| --- | --- | --- | --- |
| Polymer | $T_g$ (°C.) | $T_m$ (°C.) | $T_g$ (°C.) |
| PCL530/Phe | −25.5 | — | 75.2 |
| PCL1250/Phe | −33.1 | 41.5 | 77.4 |
| PCL2000/Phe | −51.9 | 45.3 | 75.7 |
| PEO600/Phe | −31.3 | — | 67.0 |
| PEO1000/Phe | −40.7 | — | 74.2 |

TABLE 6

Water Vapor Permeance Measurements for Polyurethanes

| Polymer | WVP (g/m²h kPa) |
| --- | --- |
| PCL530/Phe | 9.6 ± 0.4 |
| PCL1250/Phe | 7.6 ± 0.5 |
| PCL2000/Phe | 4.4 ± 0.6 |
| PEO600/Phe | 14.3 ± 1.5 |
| PEO1000/Phe | 21.6 ± 2.3 |
| Opsite ™ | 7.5 ± 0.5* |
| Tegaderm ™ | 7.4 ± 0.2* |

Mean ± SD, n = 4, *n = 6

TABLE 7

Atomic Surface Composition Data from XPS (Data Precision ± 10%)

| Polymer | Take-Off Angle (°) | Atomic Percent | | | | Percent | | O |
| --- | --- | --- | --- | --- | --- | --- | --- | --- |
| | | C1s | O1s | N1s | Si2p | C-C | C-O | C-O |
| PCL530/ Phe | 90 | 85.62 | 11.97 | 2.41 | 0.00 | 76.89 | 17.89 | 5.22 |
| | 30 | 90.13 | 7.58 | 1.59 | 0.70 | 75.73 | 19.87 | 4.40 |
| | 20 | 90.38 | 8.22 | 1.39 | 0.01 | 85.95 | 12.04 | 2.01 |
| PCL1250/ Phe | 90 | 80.82 | 17.56 | 1.51 | 0.11 | 69.97 | 21.65 | 8.39 |
| | 30 | 86.03 | 12.80 | 0.63 | 0.53 | 74.75 | 18.64 | 6.61 |
| | 20 | 76.87 | 18.94 | 0.60 | 3.59 | 74.80 | 19.27 | 5.93 |
| PCL2000/ Phe | 90 | 76.78 | 22.95 | 0.26 | 0.00 | 61.13 | 24.73 | 14.14 |
| | 30 | 77.82 | 21.33 | 0.19 | 0.66 | 66.74 | 20.98 | 12.29 |
| | 20 | 72.77 | 23.33 | 0.03 | 3.87 | 71.51 | 18.78 | 9.71 |
| PEO600/ Phe | 90 | 77.88 | 16.24 | 5.56 | 0.32 | 55.69 | 37.22 | 7.09 |
| | 30 | 78.91 | 15.00 | 5.00 | 1.09 | 57.72 | 36.22 | 6.06 |
| | 20 | 80.14 | 15.05 | 3.93 | 0.88 | 57.14 | 37.30 | 5.57 |
| PEO1000/ Phe | 90 | 71.79 | 21.72 | 5.14 | 1.35 | 48.44 | 42.99 | 8.57 |
| | 30 | 74.74 | 19.95 | 3.12 | 2.19 | 54.85 | 38.78 | 6.37 |
| | 20 | 75.73 | 21.35 | 1.40 | 1.52 | 63.89 | 29.41 | 6.70 |

TABLE 8

Characterization of LDI-based Polyurethanes Molecular Weight Data

| Polymer | $M_n$ | $M_w$ | P.D. |
| --- | --- | --- | --- |
| PCL530/Phe | 95,540 | 144,160 | 1.46 |
| PCL1250/Phe | 106,980 | 162.530 | 1.52 |
| PCL2000/Phe | 149,710 | 221,000 | 1.48 |
| PEO600/Phe | 26850 | 55190 | 2.06 |
| PEO1000/Phe | 24070 | 65700 | 2.73 |

TABLE 9

DSC Data

| | Soft Segment | |
| --- | --- | --- |
| Polymer | $T_g$ (°C.) | $T_m$ (°C.) |
| PCL530/Phe | 2.2 | |
| PCL1250/Phe | −39.2 | 42.4 |
| PCL2000/Phe | −51.9 | 45.1 |
| PEO600/Phe | −14.3 | |
| PEO1000/Phe | −30.0 | |

TABLE 10

LDI Surface Composition-XPS Data

| Polymer | Take-off Angle | C 1s | N 1s | O 1s | Si 2p | C—C | C—O | O—C=O |
| --- | --- | --- | --- | --- | --- | --- | --- | --- |
| PCL530/ Phe | 20 | 76.7 | 2.6 | 19.0 | 1.7 | 47.2 | 43.0 | 9.8 |
| | 30 | 75.1 | 4.0 | 20.7 | 0.2 | 55.0 | 32.5 | 12.5 |
| | 90 | 73.6 | 4.7 | 21.5 | 0.2 | 60.7 | 24.5 | 14.8 |
| PCL1250/ Phe | 20 | 77.2 | 1.6 | 20.0 | 1.3 | 67.4 | 24.2 | 8.4 |
| | 30 | 77.1 | 2.1 | 20.2 | 0.6 | 56.5 | 32.1 | 11.4 |
| | 90 | 75.2 | 2.7 | 21.8 | 0.3 | 66.5 | 30.5 | 13.0 |
| PCL2000/ Phe | 20 | 79.9 | 1.1 | 18.0 | 1.0 | 70.8 | 19.6 | 9.7 |
| | 30 | 80.8 | 1.3 | 17.7 | 0.2 | 64.7 | 24.9 | 10.4 |
| | 90 | 78.2 | 1.9 | 19.9 | 0.0 | 64.6 | 23.4 | 12.0 |
| PEO600/ Phe | 20 | 73.6 | 5.4 | 20.5 | 0.5 | 54.6 | 36.2 | 9.2 |
| | 30 | 72.5 | 6.2 | 21.2 | 0.1 | 49.6 | 40.4 | 10.0 |
| | 90 | 70.3 | 6.4 | 23.3 | 0.0 | 39.2 | 48.8 | 12.0 |
| PEO1000/ Phe | 20 | 70.3 | 4.1 | 24.7 | 0.9 | 42.3 | 47.4 | 10.3 |
| | 30 | 69.2 | 4.9 | 25.6 | 0.3 | 40.7 | 47.6 | 11.6 |
| | 90 | 66.3 | 5.3 | 28.3 | 0.1 | 34.7 | 50.9 | 14.4 |

TABLE 11

Characterization of CBZ Lys chain extended polyurethanes (using LDI)

Molecular Weight Data

| Polymer | $M_n$ | $M_w$ | P.D. |
|---|---|---|---|
| PCL1250/CLys | 15,830 | 40,216 | 2.54 |

DSC Data

| Polymer | Soft Segment $T_g$ (°C.) | Hard Segment $T_m$ (°C.) |
|---|---|---|
| PCL1250/CLys | −24.8 | 41.8 |
| PCL2000/CLys | −51.9 | 56.8 |

XPS Data-CBZ Lys polyurethane

| Polymer | Take-off Angle | C 1s | N 1s | O 1s | Si 2p | C—C | C—O | O—C=O |
|---|---|---|---|---|---|---|---|---|
| PCL1250/ CBZLys | 20 | 75.8 | 3.6 | 19.2 | 1.4 | 56.1 | 32.7 | 11.2 |
|  | 30 | 76.0 | 3.9 | 19.7 | 0.4 | 58.1 | 30.4 | 11.6 |
|  | 90 | 73.2 | 5.6 | 21.1 | 0.1 | 56.4 | 29.3 | 14.3 |

What is claimed is:

1. A biodegradable polyurethane material having a backbone containing at least one amino acid group and formed by reaction of a polyol, a diisocyanate and a chain extender, said chain extender being formed by reaction of an amino acid with a diol, said amino acid group being present in said chain extender and in a condition rendering it recognizable by a biological agent.

2. A polyurethane as defined in claim 1 wherein said biological agent is an enzyme.

3. A polyurethane as defined in claim 2 wherein said enzyme is an endogenous enzyme.

4. A polyurethane as defined in claim 3 wherein said amino acid group is naturally occurring.

5. A polyurethane as defined in claim 4 wherein said amino acid group includes amino acid residues of the L configuration.

6. A polyurethane as defined in claim 1 wherein said amino acid group includes at least one amino acid residue having a side which is substantially unaltered.

7. A polyurethane as defined in claim 6 wherein said amino acid is selected from the group consisting of L-phenylalanine and L-lysine.

8. A polyurethane as defined in claim 1 wherein said diisocyanate is an amino acid lysine-based diisocyanate.

9. A polyurethane as defined in claim 1 wherein said diisocyanate is an aliphatic diisocyanate.

10. A polyurethane as defined in claim 1 wherein said chain extender is formed by reaction of a plurality of amino acids.

11. A polyurethane as defined in claim 1 wherein said chain extender has a plurality of amino acid groups.

12. A polyurethane as defined in claim 1 wherein said diol is an aliphatic diol.

13. A polyurethane as defined in claim 1 wherein said polyol is selected form the group consisting of polyethylene oxide and polycaprolactone diol.

14. A method for forming a biodegradable polyurethane material having a backbone containing at least one amino acid group, the method comprising the steps of:

forming a chain extender by reacting an amino acid with a diol;

reacting said chain extender with a diisocyanate and a polyol in suitable conditions to form said polyurethane, in such a manner that said amino acid is in a condition rendering it recognizable by a biological agent.

15. A method as defined in claim 14 wherein said the reacting step includes the steps of:

reacting said diisocyanate with said polyol to in suitable conditions to yield a prepolymer; and reacting said prepolymer with said chain extender in suitable conditions to yield said polyurethane.

16. A biodegradable polyurethane material having a backbone containing at least one amino acid group and formed by reaction of a polyol selected from the group consisting of polyethylene oxide, polypropylene oxide, polytetramethylene oxide, polyethylene adipate, polytetramethylene adipate and polycaprolatone diol, a diisocyanate and a chain extender, said chain extender being formed by reaction of an amino acid with a diol, and in a condition rendering it recognizable by a biological agent.

17. A biodegradable segmented polyurethane material having a backbone containing at least one amino acid group and formed by reaction of a polyol, a diisocyanate and a chain extender, said chain extender being formed by reaction of an amino acid with a diol, and in a condition rendering it recognizable by a biological agent.

18. A segmented polyurethane material having a backbone containing at least one amino acid group and formed by reaction of a polyol, a diisocyanate and a chain extender, said chain extender being formed by reaction of an amino acid with a diol, and in a condition rendering it recognizable by a biological agent, wherein the polyurethane is formed from constituents which are selected so as to be degradable to substantially non toxic constituents.

19. A segmented polyurethane material having a backbone containing, as constituents, at least one amino acid group and formed by reaction of a polyol, a diisocyanate and a chain extender, said chain extender being formed by reaction of an amino acid with a diol, and in a condition rendering it recognizable by a biological agent, wherein the constituents which are selected to minimize toxicity in the enzymatic digests thereof.

20. A substrate suitable for use as a biomaterial and formed from a biodegradable segmented polyurethane material having a backbone containing at least one amino acid group and formed by reaction of a polyol, a diisocyanate and a chain extender, said chain extender being formed by reaction of an amino acid with a diol, and in a condition rendering it recognizable by a biological agent.

21. A substrate as defined in claim 20 wherein the substrate is in a form useful as an artificial skin, a wound dressing or a tissue engineering scaffold.

22. A substrate as defined in claim 20 having a molecular weight ranging from approximately 25,000 to 140,000.

23. A biodegradable segmented polyurethane material having a backbone containing at least one amino acid group and formed by reaction of a polyol, a diisocyanate and a chain extender, said chain extender being formed by reaction of an amino acid with a diol, and in a condition rendering the amino acid recognizable by a biological agent, thereby to form a hard segment containing a number of enzymatically cleavable sites containing the amino acid and at least one hydrolytically cleavable site containing an ester.

* * * * *